United States Patent
Srinivasan et al.

(10) Patent No.: US 12,553,727 B2
(45) Date of Patent: Feb. 17, 2026

(54) ROUTE SELECTION USING MACHINE-LEARNED SAFETY MODEL

(71) Applicant: Uber Technologies, Inc., San Francisco, CA (US)

(72) Inventors: Harish Mayur Srinivasan, Long Beach, CA (US); Robert Dominic Kyle, San Francisco, CA (US); Abbas Hooshmand Salemian, El Cerrito, CA (US); Yanwei Zhang, San Francisco, CA (US); Patrick Tsung-Ping Muh, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/637,967

(22) Filed: Apr. 17, 2024

(65) Prior Publication Data

US 2024/0263952 A1    Aug. 8, 2024

Related U.S. Application Data

(63) Continuation of application No. 17/452,649, filed on Oct. 28, 2021, now abandoned.
(Continued)

(51) Int. Cl.
  *G01C 21/00*   (2006.01)
  *G01C 21/34*   (2006.01)
  *G01C 21/36*   (2006.01)

(52) U.S. Cl.
  CPC ..... *G01C 21/3461* (2013.01); *G01C 21/3492* (2013.01); *G01C 21/3626* (2013.01)

(58) Field of Classification Search
  CPC ............ G01C 21/3461; G01C 21/3492; G01C 21/3626; G01C 21/3438; G01C 21/3697;
  (Continued)

(56) References Cited

U.S. PATENT DOCUMENTS

| | | |
|---|---|---|
| 9,574,888 B1 | 2/2017 | Hu et al. |
| 2010/0036599 A1* | 2/2010 | Froeberg ............ G01C 21/3461 |
| | | 701/532 |

(Continued)

OTHER PUBLICATIONS

"U.S. Appl. No. 17/452,649, Examiner Interview Summary mailed Oct. 17, 2023", 2 pgs.
(Continued)

*Primary Examiner* — Anne Marie Antonucci
*Assistant Examiner* — Jordan T Smith
(74) *Attorney, Agent, or Firm* — Schwegman Lundberg & Woessner, P.A.

(57) ABSTRACT

Systems and methods of configuring and using a machine-learned safety risk model to predict a corresponding risk of vehicular collision for different candidate routes are disclosed herein. In some example embodiments, a computer system obtains accident data and feature data for historical routes that have been communicated electronically as navigation guidance, trains a safety risk model using the accident data and the feature data of the historical routes as training data in a machine learning process, and then evaluates one or more routing algorithms by generating a corresponding set of routes for each routing algorithm and generating a corresponding performance measurement for each set of routes using the trained safety risk model.

20 Claims, 13 Drawing Sheets

Related U.S. Application Data

(60) Provisional application No. 63/198,586, filed on Oct. 28, 2020.

(58) Field of Classification Search
CPC ....... G08G 1/096816; G08G 1/096866; G08G 1/166; G08G 1/0969; G08G 1/164
See application file for complete search history.

(56) References Cited

U.S. PATENT DOCUMENTS

| | | | |
|---|---|---|---|
| 2012/0123806 A1* | 5/2012 | Schumann, Jr. | G06Q 40/08 705/4 |
| 2012/0136567 A1 | 5/2012 | Wang et al. | |
| 2012/0173290 A1 | 7/2012 | Collins et al. | |
| 2016/0167652 A1 | 6/2016 | Slusar | |
| 2018/0276485 A1* | 9/2018 | Heck | G06N 7/01 |
| 2018/0340790 A1* | 11/2018 | Kislovskiy | G01C 21/3484 |
| 2019/0107404 A1* | 4/2019 | Zhong | G06Q 30/0284 |
| 2020/0109959 A1 | 4/2020 | Wu et al. | |
| 2020/0111169 A1 | 4/2020 | Halder et al. | |
| 2021/0048300 A1* | 2/2021 | Saavedra Román | G01C 21/3476 |
| 2021/0164792 A1 | 6/2021 | Pal et al. | |
| 2022/0034673 A1* | 2/2022 | Grimm | G06N 20/00 |
| 2022/0128370 A1 | 4/2022 | Srinivasan et al. | |
| 2023/0349706 A1* | 11/2023 | Sanchez | G06N 3/08 |
| 2023/0375351 A1* | 11/2023 | Palanisamy | G01C 21/3484 |
| 2025/0085135 A1* | 3/2025 | Collins | G08G 1/0141 |
| 2025/0231038 A1* | 7/2025 | Simoudis | G01C 21/3407 |

OTHER PUBLICATIONS

"U.S. Appl. No. 17/452,649, Non Final Office Action mailed Jul. 17, 2023", 17 pgs.

"U.S. Appl. No. 17/452,649, Notice of Allowance mailed Jan. 24, 2024", 12 pgs.

"U.S. Appl. No. 17/452,649, Response filed Oct. 17, 2023 to Non Final Office Action mailed Jul. 17, 2023", 13 pgs.

* cited by examiner

| REQUEST FOR TRANSPORTATION SERVICE | HISTORICAL ROUTE | ACCIDENT DATA | FEATURE DATA |
|---|---|---|---|
| REQUEST-1 | ROUTE-1 | ACCIDENT | FD-1 |
| REQUEST-2 | ROUTE-2 | NO ACCIDENT | FD-2 |
| REQUEST-3 | ROUTE-3 | NO ACCIDENT | FD-3 |
| ... | ... | ... | ... |
| REQUEST-N | ROUTE-N | ACCIDENT | FD-N |

FIG. 3

| REQUEST | HISTORICAL ROUTE | ROAD SEGMENT | ACCIDENT DATA | FEATURE DATA |
|---|---|---|---|---|
| REQUEST-1 | ROUTE-1 | SEGMENT-1 | NO ACCIDENT | FD-1 |
| | | SEGMENT-2 | NO ACCIDENT | FD-2 |
| | | SEGMENT-3 | ACCIDENT | FD-3 |
| | | . . . | . . . | . . . |
| | | SEGMENT-N | NO ACCIDENT | FD-N |
| . . . | . . . | . . . | . . . | . . . |

*FIG. 6*

ROUTE SELECTION USING MACHINE-LEARNED SAFETY MODEL

CLAIM FOR PRIORITY

This application is a continuation of U.S. application Ser. No. 17/452,649, filed Oct. 28, 2021, which claims the benefit of priority of U.S. Provisional Application Ser. No. 63/198,586, filed Oct. 28, 2020, each of which is hereby incorporated by reference in its entirety.

TECHNICAL FIELD

Embodiments of the present disclosure relate generally to the technical field of electronic navigation devices and, more particularly, but not by way of limitation, to systems and methods of configuring and using a machine-learned safety risk model to predict a corresponding risk of vehicular collision for different candidate routes.

BACKGROUND

A networked computer system may be configured to provide navigation guidance to a computing device for use by a user of the computing device in navigating from a starting geographic location to a destination geographic location. As part of providing the navigation guidance, the networked computer system may generate a route from the starting geographic location to the destination geographic location and communicate the generated route to the user via the computing device. Current techniques for generating routes fail to accurately, effectively, and efficiently process dynamic features associated with different routes, such as different levels of risk of vehicular collision for each route. The present disclosure addresses these and other technical problems.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 3 illustrates a mapping of accident data and feature data stored in association with corresponding historical routes, in accordance with some example embodiments.

FIG. 6 illustrates a mapping of accident data and feature data stored in association with corresponding segments of historical routes, in accordance with some example embodiments.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for configuring and using a machine-learned safety risk model to predict a corresponding risk of vehicular collision for different candidate routes. A vehicular collision is any collision in which a vehicle collides with another vehicle or with some other object. A vehicle is any machine that may be used to transport people or goods, including, but not limited to, motor vehicles (e.g., cars, sport utility vehicle, trucks, vans, motorcycles), bicycles, scooters, and unmanned aerial vehicles (e.g., delivery drones). In some example embodiments, a technical solution involves training a safety risk model using accident data and feature data of historical routes as training data in a machine learning process. As a result, the machine-learned safety risk model may be used to accurately, effectively, and efficiently process dynamic features associated with different routes. For example, the machine-learned safety risk model may be used in providing a suggested route to a user, as well as in analyzing the performance of a new routing algorithm with respect to the performance of an older routing algorithm for which the new routing algorithm is being proposed to replace. Additionally, other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the processor(s) to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

Figure 1:
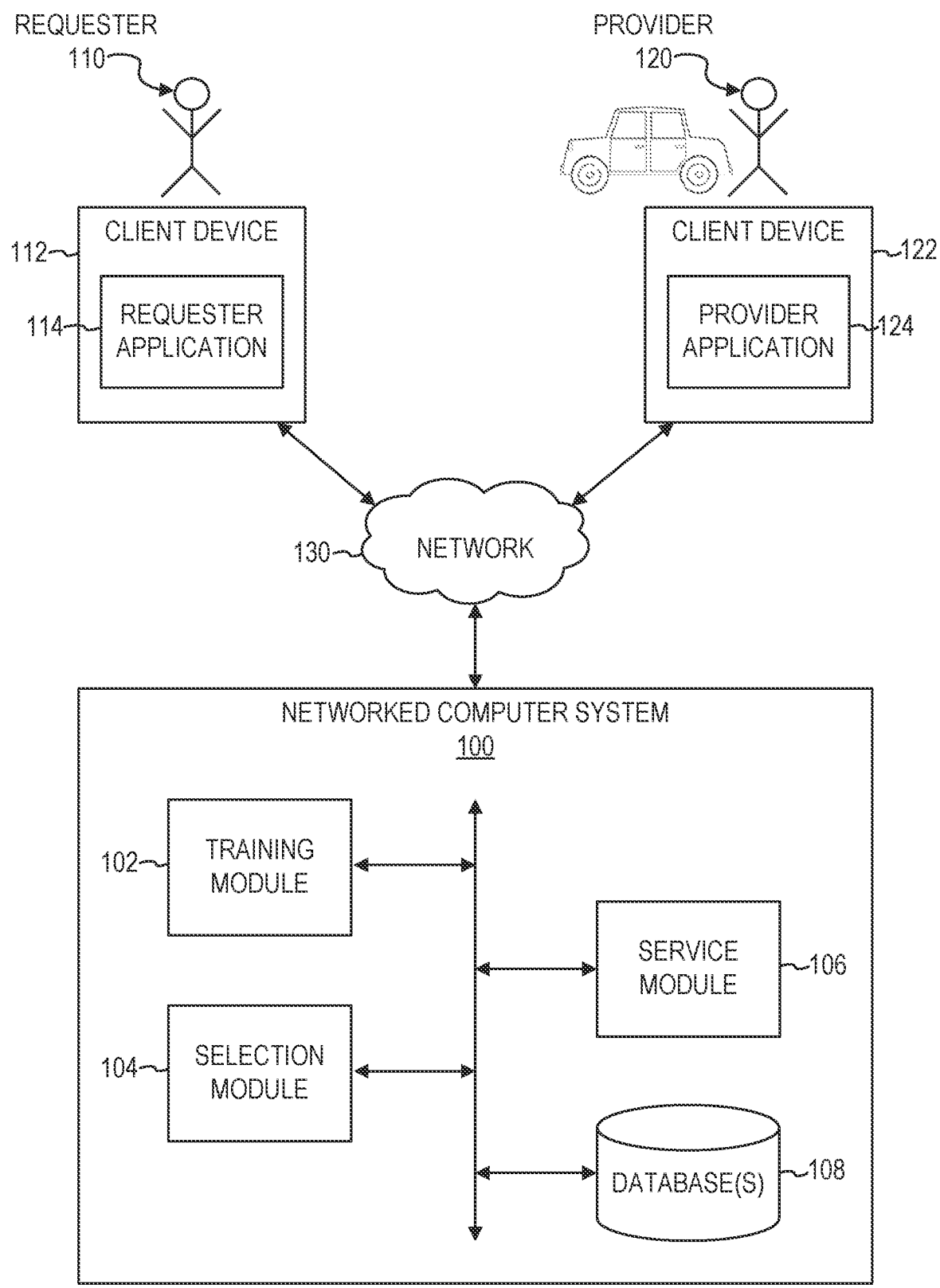
FIG. 1 is a block diagram of a system environment for a networked computer system, in accordance with some example embodiments.

FIG. 1 is a block diagram of a system environment for a networked computer system 100, in accordance with some example embodiments. In some example embodiments, the networked computer system 100 coordinates transportation of persons and/or goods/items for a service requester 110 (e.g., a rider) by a service provider 120 (e.g., a driver of a vehicle). The provider 120 uses a vehicle to provide the transportation to the requester 110.

In some example embodiments, the networked computer system 100 comprises any combination of one or more of a training module 102, a selection module 104, a service module 106, and one or more databases 108. These modules and databases are not native components of a generic computer system, and provide structures and functions beyond generic functions of a computer system, as further described below.

In some example embodiments, the modules 102, 104, and 106 and the database(s) 108 reside on a machine having a memory and at least one processor (not shown). In some example embodiments, the modules 102, 104, and 106 and the database(s) 108 reside on the same machine, while in other example embodiments, one or more of the modules 102, 104, and 106 and the database(s) 108 reside on separate remote machines that communicate with each other via a network (e.g., a network 130). It is contemplated that other configurations are also within the scope of the present disclosure.

In some example embodiments, the requester 110 operates a client device 112 that executes a requester application 114 that communicates with the networked computer system 100. The requester 110 operates the requester application 114 to view information about the networked computer system 100, and to make a request for service from the networked computer system 100 for a delivery or transport service ("a trip") of the requester 110 (and, optionally, additional persons) and/or items (e.g., cargo) needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, such as a global positioning system (GPS) component, a wireless networking system, or a combination thereof. For purposes of simplicity, as described herein, the origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends the pick-up location to the requester 110 based on historical trip data associated with the origin location.

According to examples herein, the requester client device 112 transmits a set of data to the networked computer system 100 over a network 130 in response to requester 110 input or operation of the requester application 114. Such data can be indicative of the requester's interest in potentially requesting service (e.g., before actually confirming or requesting the service). For example, the requester 110 may launch the requester application 114 and specify an origin location and/or a destination location to view information from the networked computer system 100 before making a decision on whether to request service. The requester 110 may want to view information about the average or estimated time of arrival for pick up by the provider 120, an estimated time to the destination, a corresponding cost, available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 generates and transmits the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or a WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 generates data corresponding to a request for the service through the networked computer system 100 (e.g., also referred to herein as a "trip request"). In response to receiving a trip request, the networked computer system 100 determines the average estimated time of arrival (ETA) at the pick-up location of providers 120 whose current location are within a threshold distance of the pick-up location (e.g., providers 120 who are all within one mile of the pickup location). In some embodiments, in response to determining that the requester's ETA at the pick-up location is within a threshold amount of time of the average ETA of nearby available providers 120, the networked computer system 100 uses information from the trip request to match the requester 110 with an available provider 120. Depending on implementation, the trip request can include requester 110 or device information (e.g., a requester identifier, a device identifier), a service type (e.g., vehicle type), and/or selected service option (such as described herein), an origin location, a destination location, a payment profile identifier, a desired departure time, and/or other data. The networked computer system 100 selects the provider 120 from a set of providers, such as based on the provider's current location and status (e.g., offline, online, available) and/or information from the trip request (e.g., service type, origin location, and/or destination location), to provide the service for the requester 110 and transport the requester 110 from the origin location to the destination location. In response to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with the available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 also presents information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that the provider 120 is currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, for example, a GPS component, a wireless networking system, or a combination thereof. The provider application 124 further allows the provider 120 to receive, from the networked computer system 100, an invitation message to provide a service for the requesting requester 110, and if the provider 120 accepts, the provider application 124 transmits an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable electronic devices such as smartphones, tablet devices, wearable computing devices (e.g., smartwatches), or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, present information received from the networked computer system 100 on a requester interface, such as a map of the geographic region, and the current location of the requester client device 112 or the provider client device 122. The applications 114 and 124 running on the requester client device 112 and the provider client device 124 can determine the current location of the respective device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update the database(s) 108 with the availability status. The networked computer system 100 is also configured to receive trip requests from the requester application 114 and create corresponding trip records in the database(s) 108. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when the provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database(s) 108 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, such as, for example, a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off the requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester 110 and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 108, and then transmit the geographical location of the place to the requester application 114 and the provider application 124 for use in generating the corresponding map data and navigation instructions that are to be generated and displayed by the requester application 114 and the provider application 124. In other example embodiments, the corresponding map data and navigation instructions are generated by the networked computer system 100 using the geographical location of the place stored in the database(s) 108 of the networked computer system 100 in association with an identifier of the place (e.g., a name of the place, an address of the place), and then transmitted to the requester application 114 and the provider application 124 for display on the client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some example embodiments, the training module 102 is configured to obtain corresponding accident data and corresponding feature data for each one of a plurality of historical routes that have been communicated electronically as navigation guidance. Each one of the plurality of historical routes may have been communicated electronically to a corresponding user of a corresponding client device. In one example, each one of the plurality of historical routes has been communicated electronically to a corresponding client device 122 of a corresponding provider 120 of a transportation service in association with a corresponding request for the transportation service in order to provide navigation guidance to the corresponding provider 120 during the servicing of the corresponding request.

Figure 2:
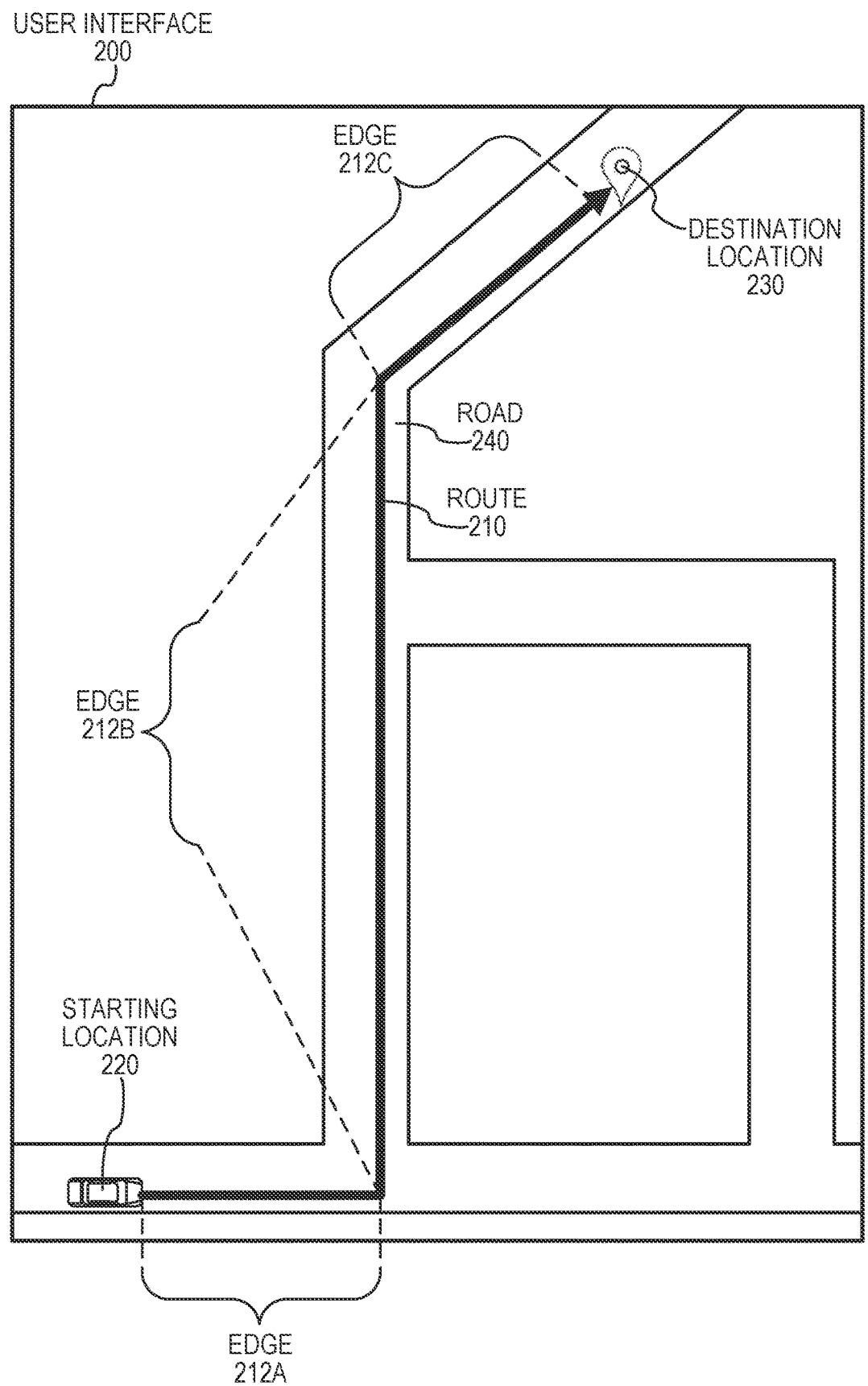
FIG. 2 illustrates a graphical user interface (GUI) within which a route from a starting geographic location to a destination geographic location is displayed, in accordance with some example embodiments.

FIG. 2 illustrates a graphical user interface (GUI) 200 within which a route 210 from a starting geographic location 220 to a destination geographic location 230 is displayed, in accordance with some example embodiments. The route 210 is formed from a plurality of edges 212. The edges 212 connect to form a path along one or more roads 240 from the starting geographic location 220 to the destination geographic location 230. Each edge 212 of the route 210 comprises a portion of the route 210 that is connected to another edge 212 of the route 210 by a navigational maneuver. For example, in the example shown in FIG. 2, the route 210 is formed from edges 212A, 212B, and 212C. The edge 212A is connected to the edge 212B via a 90-degree left turn maneuver, and the edge 212B is connected to the edge 212C via a 45-degree right turn maneuver. Each edge 212 corresponds to an instruction that is provided as navigational guidance. For example, the edges 212 and maneuvers of the route 210 may be provided as part of turn-by-turn navigation instructions for use as navigational guidance. In some example embodiments, the edges 212 and maneuvers of a route 210 may be retrieved, extracted, or otherwise obtained from turn-by-turn navigation instructions that have been used to provide the navigational guidance for the route 210 to a user, and then used to train a safety risk model, as will be discussed in further detail below. However, the edges 212 and maneuvers of the route 210 may be retrieved, extracted, or otherwise obtained from other sources, including, but not limited to, telematics data stored in the database(s) 108. Although FIG. 2 shows the route 210 being provided as a series of lines overlaying a map of a geographical area, the route 210 may additionally or alternatively be provided as a set of text-based turn-by-turn navigational instructions.

In some example embodiments, the corresponding accident data and the corresponding feature data for each one of the plurality of historical routes may be stored in the database(s) 108 in association with the corresponding request for the transportation service. FIG. 3 illustrates a mapping 300 of accident data and feature data stored in association with corresponding historical routes, in accordance with some example embodiments. Each historical route (ROUTE-1, ROUTE-2, ROUTE-3, . . . , ROUTE-N) in the mapping 300 is stored in association with a corresponding request for transportation service (REQUEST-1, REQUEST-2, REQUEST-3, . . . , REQUEST-N).

In some example embodiments, the corresponding accident data for each historical route indicates whether a vehicular accident occurred in association with the historical route. The accident data in the mapping 300 in FIG. 3 is shown as "ACCIDENT" indicating that a vehicular accident occurred in association with the corresponding historical route or as "NO ACCIDENT" indicating that a vehicular accident did not occur in association with the corresponding historical route. However, it is contemplated that other binary indications of whether a vehicular accident occurred may be employed, such as YES/NO" and 1/0.

In some example embodiments, the accident data is extracted from an accident claim or some other type of report of an accident stored in association with the historical route (e.g., stored in the database(s) 108). For example, if a requester 110 or a provider 120 is involved in a vehicular accident (e.g., a single car collision or a multi-car collision) during a trip that is being serviced by the provider 120 for the requester 110 and for which a route for the trip is generated and communicated to the provider 120 for servicing of the trip, the requester 110 or the provider 120 may submit an accident claim electronically via the requester application 114 or the provider application 124, respectively, on the respective client device 112 or 122. The submitted accident claim (e.g., the detailed information included within the submitted accident claim) may be stored in the database(s) 108 in association with the trip and the route (e.g., stored as a historical route) provided for the trip. In some example embodiments, the accident data is associated with the request corresponding to the trip from the starting geographic location 220 to the destination geographic location 230 based on the underlying accident occurring between the time at which the provider 120 has started transporting the requester 110 and the time at which the provider 120 has completed transporting the requester 110. The accident data may also be associated with the request corresponding to the trip from the starting geographic location 220 to the destination geographic location 230 based on the underlying accident occurring between the time at which the provider 120 accepts the invitation message to service the trip request for the requester 110 and the time at which the provider 120 picks up the requester 110, such as the time at which the provider 120 has started transporting the requester 110, which may be indicated by the provider 120 providing an electronic signal that the provider 120 has started transporting the requester 110.

Furthermore, in addition to the request for service being for transportation of a person, such as for transportation of the requester 110, the request for service may also be for delivery trips involving the transportation of products or cargo. For such delivery trips, accident data may be associated with the request corresponding to the trip based on the underlying accident occurring between the time at which the provider 120 picks up the product(s) or cargo and the time at which the provider 120 drops off the product(s) or cargo. The accident data may also be associated with the request corresponding to the delivery trip from the starting geographic location 220 to the destination geographic location 230 based on the underlying accident occurring between the time at which the provider 120 accepts the invitation message to service the delivery trip request and the time at which the provider 120 picks up the product(s) or cargo, such as the time at which the provider 120 has started transporting the product(s) or cargo, which may be indicated by the provider 120 providing an electronic signal that the provider 120 has started transporting the product(s) or cargo.

Figure 4:
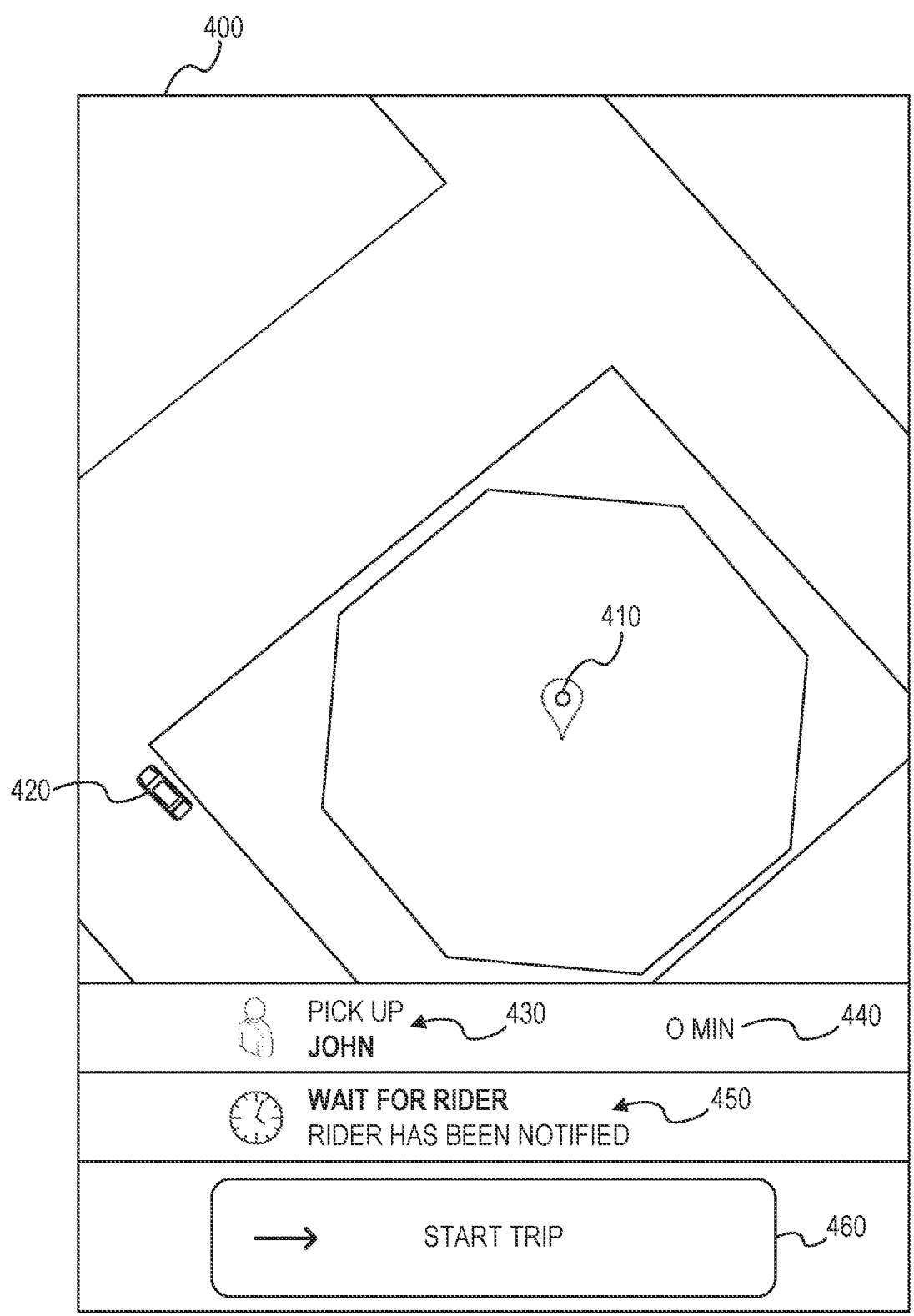
FIG. 4 illustrates a GUI in which a provider of a service may signal that the provider has started transporting a requester, in accordance with some example embodiments.

FIG. 4 illustrates a GUI 400 in which the provider 120 of a service may signal that the provider 120 has started transporting the requester 110, in accordance with some example embodiments. The GUI 400 may be generated by the provider application 124 and display an indication 410 of a geographical location of a place and an indication 420 of a geographical location of the provider 120 or the client device 122 of the provider 120. The GUI 400 may also display supplemental information, such as an identification 430 of a requester 110 to be picked up by the provider 120, an indication 440 of an amount of time until the provider 120 or the client device 122 of the provider 120 arrives at the pick-up location, and an indication 450 that the requester 110 has been notified that the provider 120 has arrived at the pick-up location. In some example embodiments, the GUI 400 comprises a selectable user interface element 460 (e.g., a button configured to be swiped or tapped by the provider 120) configured to, in response to its selection by the provider 120, trigger transmission of a signal to the networked computer system 100 indicating that the provider 120 is starting or has started the transporting of the requester 110 in servicing the request. The networked computer system 100 may use the signal to determine that the trip began at the time and location corresponding to the selection of the selectable user interface element 460.

Figure 5:
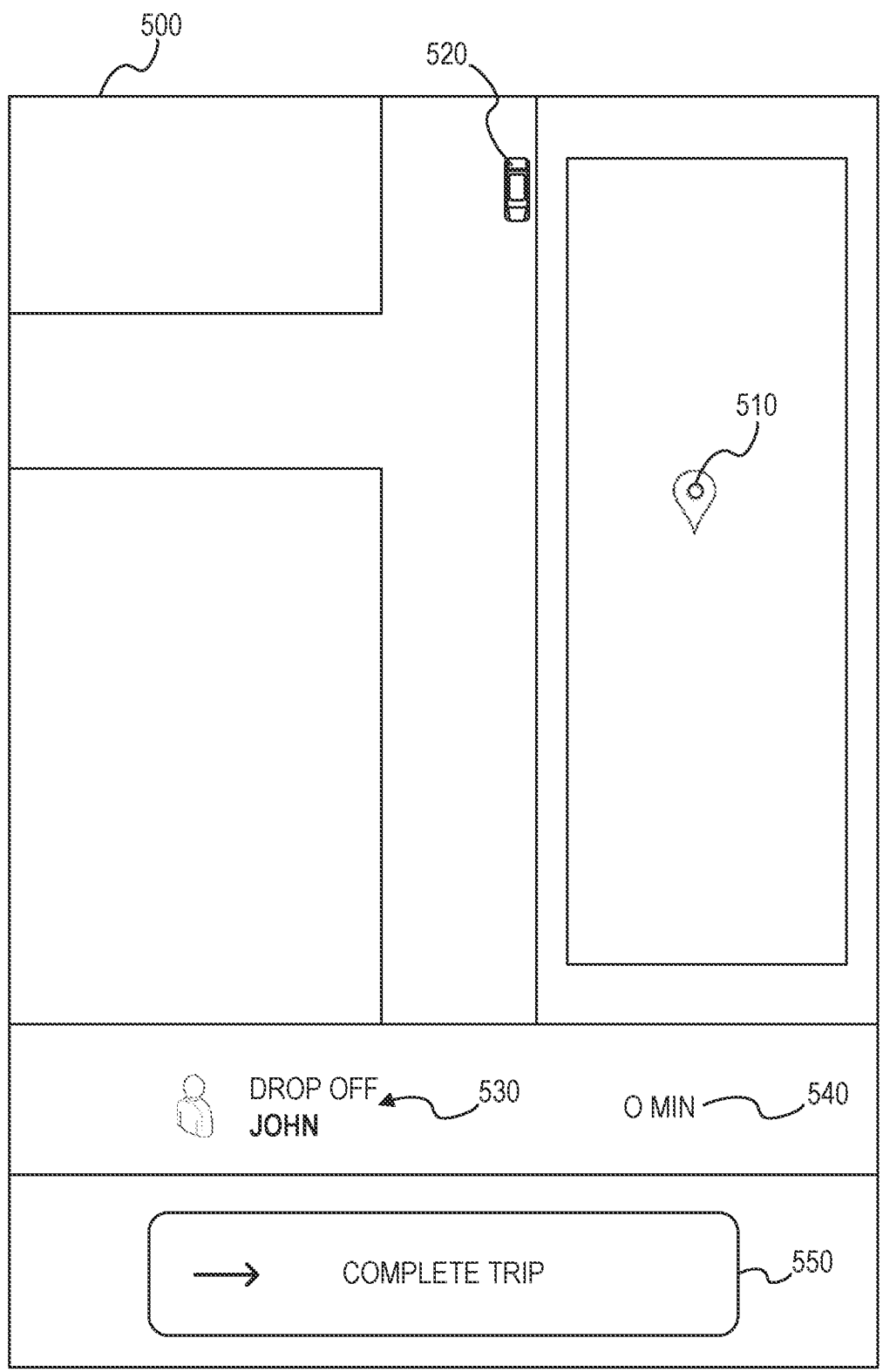
FIG. 5 illustrates a GUI in which the provider of the service may signal that the provider has completed transporting the requester, in accordance with some example embodiments.

FIG. 5 illustrates a GUI 500 in which the provider 120 of the service may signal that the provider 120 has completed transporting the requester 110, in accordance with some example embodiments. The GUI 500 may be generated by the provider application 124 and display an indication 510 of a geographical location of a place and an indication 520 of the geographical location of the provider 120 or the client device 122 of the provider 120. The GUI 500 may also display supplemental information, such as an identification 530 of a requester 110 to be dropped off by the provider 120 and an indication 540 of the amount of time until the provider 120 or the client device 122 of the provider 120 arrives at the drop-off location. In some example embodiments, the GUI 500 comprises a selectable user interface element 550 (e.g., a button configured to be swiped or tapped by the provider 120) configured to, in response to its selection by the provider 120, trigger transmission of a signal to the networked computer system 100 indicating that the provider 120 is completing or has completed the transporting of the requester 110 in servicing the request. The networked computer system 100 may use the signal to determine that the trip ended at the time and location corresponding to the selection of the selectable user interface element 550.

The networked computer system 100 may use the determinations of the beginning and ending of the trip as boundaries for the trip in order to determine whether accident data and feature data corresponds to the route 210. For example, if a reported vehicular accident occurred prior to the beginning of the trip or after the ending of the trip, the training module 102 may avoid associating accident data corresponding to the reported vehicular accident with the request or the historical route corresponding to the trip.

In some example embodiments, the feature data is based at least in part on edges 212 and maneuvers that form the historical route 210. For example, the feature data may comprise one or more edge statistics calculated based on the edges 212 of the historical route 210. Examples of edge statistics include, but are not limited to, a total number of the edges 212 of the historical route 210, an edge distance statistic based on distances of the edges 212 of the historical route 210, an edge duration statistic based on durations associated with the edges 212 of the historical route 210, an edge speed statistic based on travelling speeds associated with the edges 212 of the historical route 210, and a road class statistic based on one or more classes of roads 240 associated with the edges 212 of the historical route 210. However, other types of edge statistics are also within the scope of the present disclosure. For example, although model training may use historical travelling speeds, more recent data (e.g., travelling speeds on a road segment for the past 30 minutes) rather than a historical measure of travelling speeds aggregated over a longer period of time may be used when evaluating a specific route in real-time for route selection.

The feature data may additionally or alternatively comprise one or more maneuver statistics calculated based on the maneuvers of the historical route 210. Examples of maneuver statistics include, but are not limited to, a total number of the maneuvers of the historical route 210, a maneuver distance statistic based on distances of the maneuvers of the historical route 210, a maneuver duration statistic based on durations associated with the maneuver of the historical route 210, a maneuver speed statistic based on speeds associated with the maneuvers of the historical route 210, a heading change statistic based on degrees of heading changes associated with the maneuvers of the historical route 210, and a compound maneuver statistic based on a total number of compound maneuvers of the historical route 210.

In some example embodiments, the feature data comprises one or more of the maneuver features in the following table:

MANEUVER FEATURES

Sum of edge distances in maneuver
Sum of edge time in maneuver
Number of edges the maneuver spans
Number of trigger points
Number of warning trigger points
If final trigger point of maneuver contains another maneuver
Sum of absolute edge heading change in maneuver
Road class at the start of maneuver. One of Highway, Arterial, Alleyway, Local.
Road class at the end of maneuver
Concatenation of-road class at the start of maneuver and road class at the end of maneuver to indicate whether the maneuver leads to change of road class (e.g., Highway to Local)
Distance at first warning trigger point
Distance at last warning trigger point
Maneuver icon type (e.g., "STAR", "EXIT_LEFT")
Maneuver direction associated with the exit leg (e.g., "STRAIGHT", "LEFT", "SHARP LEFT")
Maneuver directions associated with all possible legs. Length indicates the number of legs at the maneuver.

Feature data may be derived by aggregating features at the edge or maneuver level to the route level. In some example embodiments, the training module 102 computes statistics from the edge- or maneuver-level features to represent them at the route level. For example, from an array of edge speeds for a route 210, the training module 102 may derive the min, max, mean, and standard deviation of speed across all edges 212 of a route 2120. In some example embodiments, the feature data comprises one or more of the route features in the following table:

ROUTE FEATURES

Number of edges in route
Number of maneuvers in route
Summary stats of edge distance in route
Summary stats of edge time in route
Summary stats of edge speed in route
Distribution of edge by road class
Summary stats of maneuver distance across maneuvers
Summary stats of maneuver time across maneuvers
Summary stats of maneuver speed across maneuvers
Summary stats of number of warnings across maneuvers
Summary stats of first warning distance across maneuvers
Summary stats of last warning distance across maneuvers
Summary stats of heading changes across maneuvers

ROUTE FEATURES -continued

Summary stats of possible legs across maneuvers
Summary stats of compound maneuver across maneuvers
Distribution of maneuvers by icon type
Distribution of maneuvers by exit direction
Distribution of maneuvers by road class In some example embodiments, the feature data also includes contextual features for each trip. Examples of such contextual features may include, but are not limited to, a time of day at which the trip occurs, a day of the week at which the trip occurs, weather conditions during the trip, and traffic or congestion data for the trip.

In some example embodiments, each one of the plurality of historical routes 210 comprises a corresponding plurality of road segments, and the corresponding accident data for each one of the plurality of historical routes 210 comprises corresponding segment accident data for each one of the corresponding plurality of road segments of the historical route 210. In one embodiment, each street on a map is divided into multiple segments. A road is a linear section of the earth designed for or the result of vehicular movement. A road segment is the specific representation of a portion of a road with uniform characteristics. For example, a segment may be a few meters long or hundreds of meters long based on the type of street (e.g., highway, road, rural area, city). In one example, each segment is represented by a unique identifier. Each segment may also be associated with a geometric feature (e.g., straight line, curve, circle). A series of segments leads to the route 210 from the starting geographic location 220 to the destination geographic location 230. Accordingly, each route 210 comprises a list or a plurality of segments.

The segment accident data may indicate whether a vehicular accident occurred on the corresponding road segment, and the corresponding feature data for each one of the plurality of historical routes 210 may comprise segment feature data for each one of the corresponding plurality of road segments of the historical route 210. The segment feature data may be based at least in part on edges 212 or maneuvers corresponding to the road segment (e.g., similar to the route-level feature data discussed above).

FIG. 6 illustrates a mapping 600 of accident data and feature data stored in association with corresponding segments of historical routes, in accordance with some example embodiments. Each historical route in the mapping 600 is stored in association with a corresponding request for transportation service. In FIG. 6, a series of road segments (SEGMENT-1, SEGMENT-2, SEGMENT-3, . . . , SEGMENT-N) for a route (ROUTE-1) are stored in association with the route, and corresponding accident data and feature data is stored for each road segment, thereby providing accident data and feature data at the road segment level, as opposed to the route level shown in FIG. 3. In some example embodiments, the training module 102 uses telematics data associated with a trip for which a vehicular accident was reported to determine where along the route 210 for the trip the vehicular accident occurred. For example, if an accident claim is submitted for a trip, the training module 102 may use telematics data for the client device 122 of the provider 120 to determine that the client device 122 stopped moving at an intermediate geographic location between the starting geographic location 220 and the destination geographic location 230 for a period of time.

The training module 102 may determine that the vehicular accident occurred at the intermediate geographic location based on a determination that the client device 122 stopped moving for a period of time that exceeds a threshold amount of time that indicates that the client device 122 stopped moving because of the vehicular accident and not some other reason (e.g., traffic). The determination that the vehicular accident occurred at the intermediate geographic location may also be based on a determination that the intermediate geographic location is at least a threshold distance away from the destination geographic location 230 that indicates that the client device 122 stopped moving because of the vehicular accident and not for some other reason (e.g., to drop off the requester 110 a little bit earlier for a more convenient drop-off). The training module 102 may identify a specific road segment that corresponds to the determined intermediate geographic location, and then associate the accident data with that specific road segment.

In some example embodiments, the training module 102 is configured to train a safety risk model using the accident data and the feature data of the plurality of historical routes 210 as training data in a machine learning process. The safety risk model may comprise a gradient boosting decision tree model. However, other types of safety risk models are also within the scope of the present disclosure, including, but not limited to, linear models (e.g., a generalized linear model) and deep learning models. In some example embodiments, the safety risk model is configured to generate a corresponding safety risk score for different candidate routes based on corresponding feature data of the different candidate routes. For example, the safety risk model may generate a first safety risk score for a first candidate route based on corresponding feature data of the first candidate route (e.g., based on edge statistics and maneuver statistics for the first candidate route), and the safety risk model may generate a second safety risk score for a second candidate route based on corresponding feature data of the second candidate route (e.g., based on edge statistics and maneuver statistics for the second candidate route).

In some example embodiments, the safety risk model is configured to generate a corresponding safety risk score for each one of a plurality of road segments that form a route, such as based on the corresponding segment accident data and the corresponding segment feature data for each road segment. The safety risk scores for the plurality of road segments of the route may then be used in aggregation to generate a safety risk score for the route, such as by calculating the average (or some other statistical calculation) of the safety risk scores for the road segments of the route to determine the safety risk score for the route.

In some example embodiments, the service module 106 is configured to receive a request for a route 210 from a starting geographic location 220 to a destination geographic location 230. For example, in response to or otherwise based on the requester 110 submitting a trip request to the networked computer system 100 via the requester application 114 on the client device 112 and the provider 120 accepting to service the trip request via the provider application 124 on the client device 122, the networked computer system 100 may receive the request for the route 210.

In some example embodiments, the selection module 104 is configured to generate a plurality of candidate routes from the starting geographic location 220 to the destination geographic location 230. For example, the plurality of candidate routes may be generated based on a shortest distance from the starting geographic location 220 to the destination geographic location 230, a fastest time to travel from the starting geographic location 220 to the destination geographic location 230, a most scenic route, and so forth. In one example, candidate routes are generated by route finding or navigation technology, such as the Dijkstra algorithm.

In some example embodiments, the selection module 104 is configured to select one of the plurality of candidate routes using the trained safety risk model. The selection module 104 may select the candidate route from the plurality of candidate routes by generating a corresponding safety risk score for each one of the plurality of candidate routes using the trained safety risk model, and then selecting the candidate route from the plurality of candidate routes based at least in part on the corresponding safety risk score for the selected candidate route. In some example embodiments, the selection module 104 ranks the candidate routes based on their safety risk score and select the candidate route with the highest safety risk score (e.g., if the safety risk score has an inverse relationship with the likelihood of a vehicular accident) or the lowest safety risk score (e.g., if the safety risk score has a linear relationship with the likelihood of a vehicular accident). For example, a first candidate route with a safety risk score of 0.2 may be chosen over a second candidate route with a safety risk score of 0.9 based on the first candidate route being determined to be a safer route than the second candidate route based on their respective safety risk scores. In another example, the candidate route may be selected from the plurality of candidate routes by determining a final score for each candidate route based on a plurality of parameters (e.g., fastest route, shortest route, most scenic route) including the safety risk score, and then selecting the candidate route with the highest final score.

In some example embodiments, the safety risk scores of candidate routes are used to filter out candidate routes from further consideration for selection before the selecting of the candidate route from the plurality of candidate routes. For example, any candidate routes with a corresponding safety risk score below a predetermined threshold (or above the predetermined threshold, depending on the relationship between the relationship between the safety risk score and the likelihood of a vehicular accident) may be discarded. In one example, if a predetermined threshold is 0.5, any candidate route with a safety risk score below 0.5 are discarded/not considered for the candidate route selection (e.g., if the safety risk score has an inverse relationship with the likelihood of a vehicular accident). In another example, any candidate route comprising a safety risk score for one or more of its corresponding road segments that is below a predetermined threshold (or above the predetermined threshold, depending on the relationship between the safety risk score and the likelihood of a vehicular accident) is also discarded, as described above.

In some example embodiments, the safety risk score comprises or is based on a probability (e.g., a numerical value between 0.0 and 1.0) of a vehicular accident occurring. However, the safety risk score may additionally or alternatively comprise or be based on other measures as well, including, but not limited to, a measure of insurance claim frequency (e.g., how often insurance claims have been submitted), a measure of insurance claim severity (e.g., how severe have the insurance claims been), rates of feedback from other parties (e.g., riders) about dangerous driving (e.g., how often have complaints about driving been submitted), rates of driving behaviors measured using telematics data, and rates of other types of safety incidents. The safety risk score may comprise a weighted combination of multiple measures of the types mentioned above or others.

In some example embodiments, the service module 106 is configured to cause the selected candidate route to be displayed within a user interface on a computing device of a user. For example, the networked computer system 100 may cause the selected candidate route to be displayed as the route 210 shown in FIG. 2. In some example embodiments, an indication of an elevated risk associated with at least one road segment of the selected candidate route may be displayed in association with the selected candidate route using the trained safety risk model based on corresponding segment feature data of the selected candidate route, where the corresponding segment feature data of the selected candidate route is based at least in part on edges or maneuvers corresponding to the road segment(s) of the selected candidate route.

Figure 7:
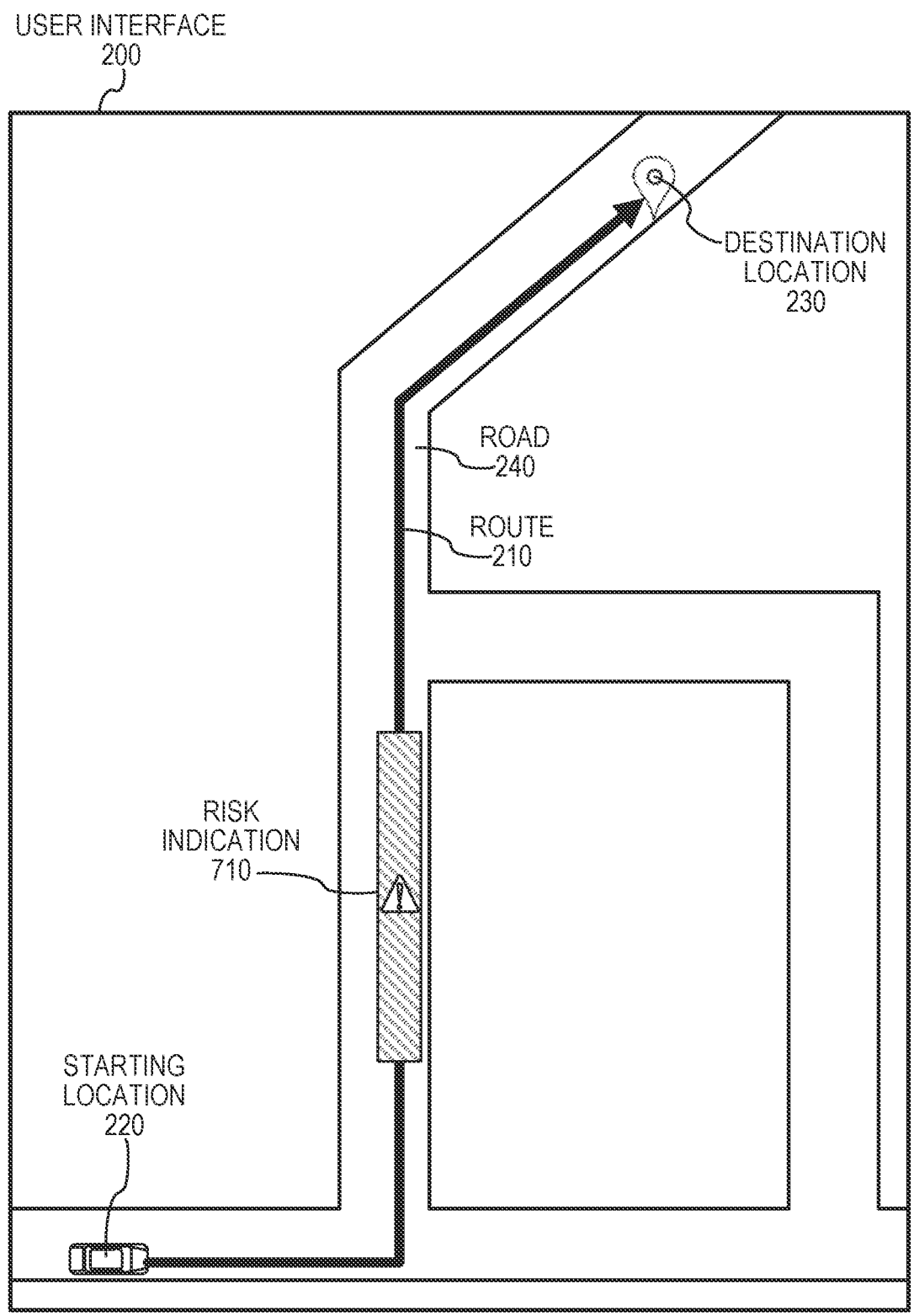
FIG. 7 illustrates a GUI within which a route from a starting geographic location to a destination geographic location is displayed along with an indication of an elevated risk associated with a road segment of the route, in accordance with some example embodiments.

FIG. 7 illustrates a GUI within which the route 210 from the starting geographic location 220 to the destination geographic location 230 is displayed along with an indication 710 of an elevated risk associated with a road segment of the route 210, in accordance with some example embodiments. The indication 710 of the elevated risk may be displayed to overlay the road segment or otherwise be displayed in a way to identify the specific road segment as having the elevated risk. In the example shown in FIG. 7, the indication 710 of the elevated risk comprises an elongated bar including a hazard icon being displayed over the portion of the route 210 that corresponds to the road segment with which the elevated risk is associated. It is contemplated that other forms of indications 710 of elevated risk may also be used, including, but not limited to, other icons, other graphic symbols or elements, color-coding (e.g., highlighting the road segment in red to indicate the elevated risk), and text indicating the elevated risk (e.g., "HIGH RISK" displayed next to or otherwise in association with the road segment).

In some example embodiments, the training module 102 is configured to analyze the performance of a new routing algorithm with respect to the performance of an older routing algorithm for which the new routing algorithm is being proposed to replace. The training module 102 may use the trained safety risk model to evaluate the performance of each routing algorithm. In some example embodiments, the training module 102 is configured to generate a first set of routes using a first routing algorithm and to generate a second set of routes using a second routing algorithm. The first and second routing algorithms may generate the first set and second set of routes, respectively, using one or more techniques. Such techniques for route generation may include, but are not limited to, generating routes based on a shortest distance from corresponding starting geographic locations to corresponding destination geographic locations, a fastest time to travel from the corresponding starting geographic locations to the corresponding destination geographic locations, a most scenic route, and so forth. Route finding or navigation technologies, such as the Dijkstra algorithm, may be employed by the routing algorithms. The second routing algorithm is different from the first routing algorithm in one or more aspects, such as by having one or more different functions, one or more different parameters, or one or more different weights.

In some example embodiments, the training module 102 is configured to generate a first performance measurement for the first routing algorithm based on the first set of routes using the trained safety risk model and to generate a second performance measurement for the second routing algorithm based on the second set of routes using the trained safety risk model. For example, the training module 102 may generate a corresponding safety risk score for each one of the routes in the first set of routes using the trained safety risk model and a corresponding safety risk score for each one of the routes in the second set of routes using the trained safety risk model, such as based on the corresponding accident data and the corresponding feature data for each route. The safety risk scores for the first set and second set of routes may then be used in aggregation to generate the first performance measurement and the second performance measurement, respectively, such as by calculating the average (or some other statistical calculation) of the safety risk scores for the first set of routes and the second set of routes, respectively, which may then be used as a key performance indicator for the routing algorithms in evaluating the performance of the routing algorithms. Other types of performance measurements may be used as well, including, but not limited to, insurance costs based on the safety risk scores of the first set of routes that are generated by the first routing algorithm.

In some example embodiments, the training module 102 is configured to cause an evaluation of the first routing algorithm or the second routing algorithm to be displayed within a user interface on a computing device of a user. The evaluation may be based on the first performance measurement and the second performance measurement. For example, the training module 102 may cause the display of the first performance measurement in association with the first routing algorithm (e.g., the calculated average safety risk score for the first set of routes being displayed in association with an identification of the first routing algorithm) and the second performance measurement in association with the second routing algorithm (e.g., the calculated average safety risk score for the second set of routes being displayed in association with an identification of the second routing algorithm).

Figure 11:
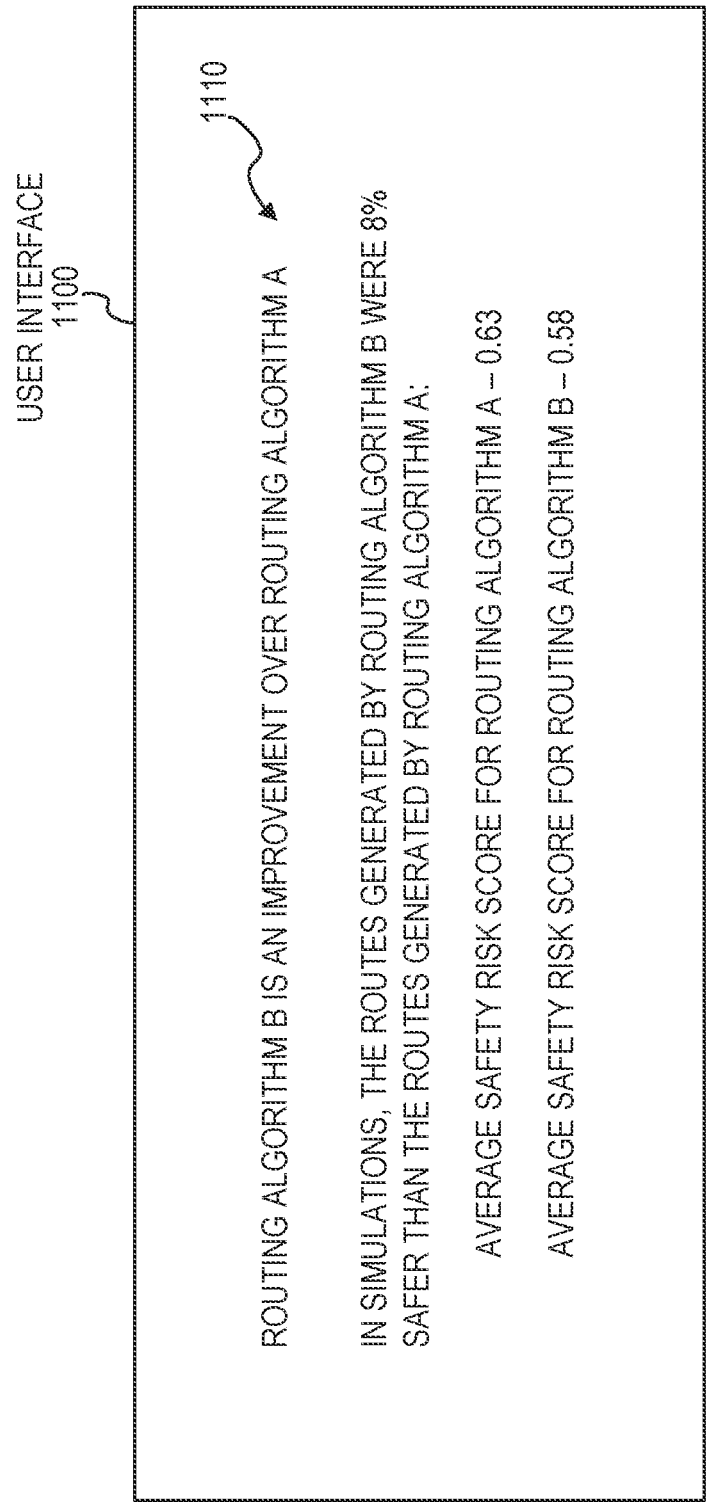
FIG. 11 illustrates a GUI within which an evaluation of a first routing algorithm and a second routing algorithm is displayed, in accordance with some example embodiments.

In some example embodiments, the training module 102 is configured to compare the first performance measurement with the second performance measurement in order to compare the performance of the first routing algorithm with the performance of the second routing algorithm. The training module 102 may then cause an evaluation based on the comparison to be displayed on a computing device of a user. For example, the training module 102 may display an indication that the second routing algorithm is an improvement on the first routing algorithm (e.g., based on the second performance measurement being higher than the first performance measurement) or that the second routing algorithm is performatively worse than or otherwise not an improvement on the first routing algorithm (e.g., based on the second performance measurement being less than or equal to the first performance measurement). Other types of evaluations may be generated and displayed by the training module 102 based on the first performance measurement and the second performance measurement. FIG. 11 illustrates a GUI 1100 within which an evaluation 1110 of a first routing algorithm (e.g., "ROUTING ALGORITHM A") and a second routing algorithm (e.g., "ROUTING ALGORITHM B") is displayed, in accordance with some example embodiments.

Figure 8:
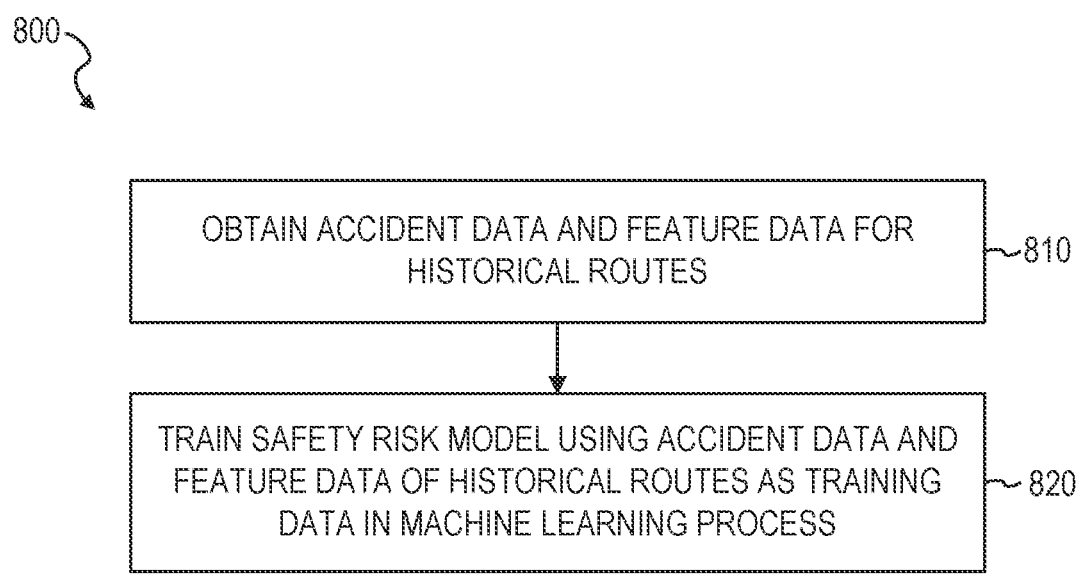
FIG. 8 is a flowchart illustrating a method of training a safety risk model, in accordance with some example embodiments.

FIG. 8 is a flowchart illustrating a method 800 of training a safety risk model, in accordance with some example embodiments. The method 800 can be performed by processing logic that comprises hardware (e.g., circuitry, dedicated logic, programmable logic, microcode), software (e.g., instructions run on a processing device), or a combination thereof. In one example embodiment, the method 800 is performed by the networked computer system 100 of FIG. 1 or any combination of one or more of its components or modules (e.g., training module 102), as described above.

At operation 810, the networked computer system 100 obtains corresponding accident data and corresponding feature data for each one of a plurality of historical routes that have been communicated electronically as navigation guidance. In some example embodiments, each one of the plurality of historical routes was communicated electronically to a corresponding client device of a corresponding provider of a transportation service in association with a corresponding request for the transportation service. The corresponding accident data and the corresponding feature data for each one of the plurality of historical routes may be stored in a database (e.g., the database(s) 108) in association with the corresponding request for the transportation service (e.g., by storing the mapping 300 of FIG. 3).

In some example embodiments, the corresponding accident data for each historical route indicates whether a vehicular accident occurred in association with the historical route. The accident data may be extracted from an accident claim or some other type of report of an accident stored in association with the historical route. For example, if a requester 110 or a provider 120 is involved in a vehicular accident (e.g., a single car collision or a multi-car collision) during a trip that is being serviced by the provider 120 for the requester 110 and for which a route for the trip is generated and communicated to the provider 120 for servicing of the trip, the requester 110 or the provider 120 may submit an accident claim electronically via the requester application 114 or the provider application 124, respectively, on the respective client device 112 or 122. The submitted accident claim (e.g., the detailed information included within the submitted accident claim) may be stored the database(s) 108 in association with the trip and the route (e.g., stored as a historical route) provided for the trip.

In addition to indicating whether a vehicular accident occurred in association with the historical route, the accident data may also comprise details about a vehicular accident if one occurred in association with the historical route. For example, the accident data may also comprise an indication of the severity of the vehicular accident. The severity of the vehicular accident may be based on a classification from a taxonomy of accident severity. The severity of the vehicular accident may additionally or alternatively be based on a monetary amount associated with the vehicular accident, such as a monetary amount associated with an insurance claim for the vehicular accident. Other types of indications of the severity of the vehicular accident are also within the scope of the present disclosure.

The accident data may also comprise time data and location data indicating when and where the vehicular accident occurred. The time data and location data may be programmatically derived by the networked computer system 100 from an analysis of the actual movement of the requester 110 or the provider 120 during the trip that is being serviced by the provider 120 for the requester 110 and for which the historical route for the trip is generated and communicated to the provider 120 for servicing of the trip. For example, if the requester 110 or the provider 120 has agreed to permit the networked computer system 100 to track the location of the corresponding client device before 112 or 122 of the requester 110 or the provider 120, then location data (e.g., tracked GPS data) of the corresponding client device 112 or 122 may be collected and used by the networked computer system 100 to determine a time and location at which the vehicular accident occurred, such as based on a lack of movement of the client device 112 or 122 during the trip for more than a threshold amount of time that indicates that a vehicular accident occurred during the trip. If the lack of movement lasted for longer than the threshold amount of time, then the networked computer system 100 may use the time at which the lack of movement began as the time of the vehicular accident and the location of the lack of movement as the location of the vehicular accident.

In some example embodiments, the feature data is based at least in part on edges and maneuvers that form the historical route. For example, the feature data may comprise one or more edge statistics calculated based on the edges of the historical route. Examples of edge statistics include, but are not limited to, a total number of the edges of the historical route, an edge distance statistic based on distances of the edges of the historical route, an edge duration statistic based on durations associated with the edges of the historical route, an edge speed statistic based on travelling speeds associated with the edges of the historical route, and a road class statistic based on one or more classes of roads associated with the edges of the historical route.

The feature data may additionally or alternatively comprise one or more maneuver statistics calculated based on the maneuvers of the historical route. Examples of maneuver statistics include, but are not limited to, a total number of the maneuvers of the historical route, a maneuver distance statistic based on distances of the maneuvers of the historical route, a maneuver duration statistic based on durations associated with the maneuver of the historical route, a maneuver speed statistic based on speeds associated with the maneuvers of the historical route, a heading change statistic based on degrees of heading changes associated with the maneuvers of the historical route, and a compound maneuver statistic based on a total number of compound maneuvers of the historical route.

In some example embodiments, each one of the plurality of historical routes comprises a corresponding plurality of road segments, and the corresponding accident data for each one of the plurality of historical routes comprises corresponding segment accident data for each one of the corresponding plurality of road segments of the historical route. The segment accident data may indicate whether a vehicular accident occurred on the corresponding road segment, and the corresponding feature data for each one of the plurality of historical routes may comprise segment feature data for each one of the corresponding plurality of road segments of the historical route. The segment feature data may be based at least in part on edges or maneuvers corresponding to the road segment (e.g., similar to the route-level feature data discussed above).

At operation 820, the networked computer system 100 trains a safety risk model using the accident data and the feature data of the plurality of historical routes as training data in a machine learning process. In some example embodiments, the safety risk model comprises a gradient boosting decision tree model. However, other types of safety risk models are also within the scope of the present disclosure, including, but not limited to, linear models and deep learning models. In some example embodiments, the safety risk model is configured to generate a corresponding safety risk score for different candidate routes based on corresponding feature data of the different candidate routes. For example, the safety risk model may generate a first safety risk score for a first candidate route based on corresponding feature data of the first candidate route (e.g., based on edge statistics and maneuver statistics for the first candidate route), and the safety risk model may generate a second safety risk score for a second candidate route based on corresponding feature data of the second candidate route (e.g., based on edge statistics and maneuver statistics for the second candidate route).

In some example embodiments, the safety risk model is configured to generate a corresponding safety risk score for each one of a plurality of road segments that form a route, such as based on the corresponding segment accident data and the corresponding segment feature data for each road segment. The safety risk scores for the plurality of road segments of the route may then be used in aggregation to generate a safety risk score for the route, such as by calculating the average (or some other statistical calculation) of the safety risk scores for the road segments of the route to determine the safety risk score for the route.

It is contemplated that any of the other features described within the present disclosure can be incorporated into the method 800.

Figure 9:
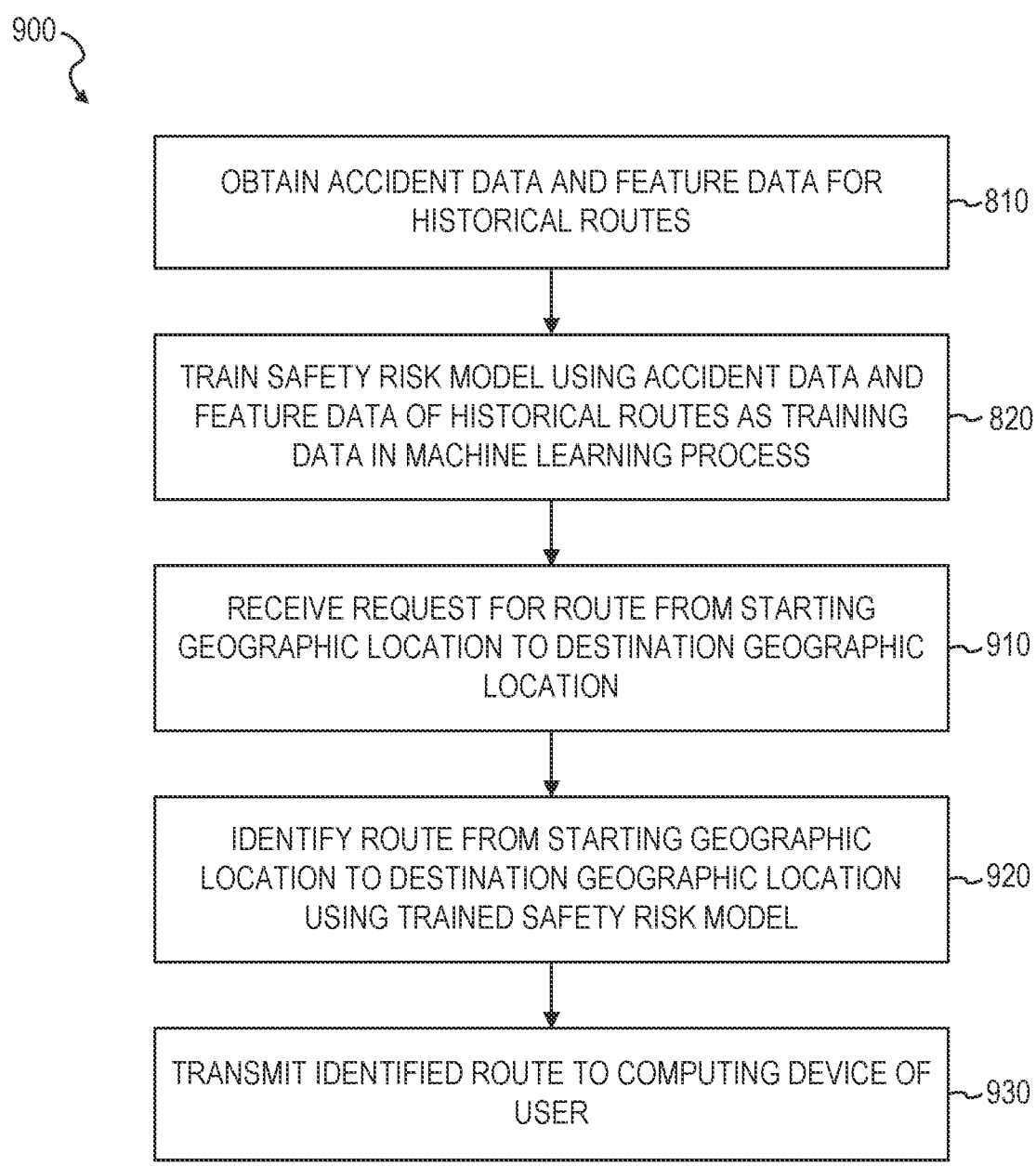
FIG. 9 is a flowchart illustrating a method of using the trained safety risk model to select a route from a starting geographic location to a destination geographic location, in accordance with some example embodiments.

FIG. 9 is a flowchart illustrating a method of using the trained safety risk model to select a route from a starting geographic location to a destination geographic location, in accordance with some example embodiments. The method 900 can be performed by processing logic that comprises hardware (e.g., circuitry, dedicated logic, programmable logic, microcode), software (e.g., instructions run on a processing device), or a combination thereof. In one example embodiment, the method 900 is performed by the networked computer system 100 of FIG. 1 or any combination of one or more of its components or modules (e.g., training module 102, selection module 104, service module 106), as described above. The method 900 comprises operations 910, 920, and 930. In some example embodiments, operations 910, 920, and 930 are performed after or concurrently with operation 820 of FIG. 8.

At operation 910, the networked computer system 100 receives a request for a route from a starting geographic location to a destination geographic location. For example, in response to or otherwise based on the requester 110 submitting a trip request to the networked computer system 100 via the requester application 114 on the client device 112 and the provider 120 accepting to service the trip request via the provider application 124 on the client device 122, the networked computer system 100 may receive the request for the route.

At operation 920, the networked computer system 100 identifies a route from the starting geographic location to the destination geographic location using the trained safety risk model. In some example embodiments, the networked computer system 100 identified the route by generating a plurality of candidate routes from the starting geographic location to the destination geographic location, and then selecting one of the plurality of candidate routes using the trained safety risk model, where the selected one of the plurality of candidate routes is the identified route For example, the plurality of candidate routes may be generated based on a shortest distance from the starting geographic location to the destination geographic location, a fastest time to travel from the starting geographic location to the destination geographic location, a most scenic route, and so forth. In one example, candidate routes are generated by route finding or navigation technology, such as the Dijkstra algorithm.

In some example embodiments, networked computer system 100 selects the candidate route from the plurality of candidate routes by generating a corresponding safety risk score for each one of the plurality of candidate routes using the trained safety risk model, and then selecting the candidate route from the plurality of candidate routes based at least in part on the corresponding safety risk score for the selected candidate route. The networked computer system 100 may rank the candidate routes based on their safety risk score and select the candidate route with the highest safety risk score (e.g., if the safety risk score has an inverse relationship with the likelihood of a vehicular accident) or the lowest safety risk score (e.g., if the safety risk score has a linear relationship with the likelihood of a vehicular accident). For example, a first candidate route with a safety risk score of 0.2 may be chosen over a second candidate route with a safety risk score of 0.9 based on the first candidate route being determined to be a safer route than the second candidate route based on their respective safety risk scores. In another example, the candidate route may be selected from the plurality of candidate routes by determining a final score for each candidate route based on a plurality of parameters (e.g., fastest route, shortest route, most scenic route) including the safety risk score, and then selecting the candidate route with the highest final score.

In some example embodiments, the safety risk scores of candidate routes are used to filter out candidate routes from further consideration for selection before the selecting of the candidate route from the plurality of candidate routes. For example, any candidate routes with a corresponding safety risk score below a predetermined threshold (or above the predetermined threshold, depending on the relationship between the relationship between the safety risk score and the likelihood of a vehicular accident) may be discarded. In one example, if a predetermined threshold is 0.5, any candidate route with a safety risk score below 0.5 are discarded/not considered for the candidate route selection (e.g., if the safety risk score has an inverse relationship with the likelihood of a vehicular accident). In another example, any candidate route comprising a safety risk score for one or more of its corresponding road segments that is below a predetermined threshold (or above the predetermined threshold, depending on the relationship between the safety risk score and the likelihood of a vehicular accident) is also discarded, as described above.

At operation 930, the networked computer system 100 transmits the identified route to another computing device. In some example embodiments, the transmitting of the identified route to the other computing device comprises causing the selected candidate route to be displayed within a user interface on a computing device of a user. For example, the networked computer system 100 may cause the selected candidate route to be displayed as the route 210 shown in FIG. 2. In some example embodiments, an indication of an elevated risk associated with at least one road segment of the selected candidate route may be displayed in association with the selected candidate route, such as shown in FIG. 7, using the trained safety risk model based on corresponding segment feature data of the selected candidate route, where the corresponding segment feature data of the selected candidate route is based at least in part on edges or maneuvers corresponding to the road segment(s) of the selected candidate route.

It is contemplated that any of the other features described within the present disclosure can be incorporated into the method 900.

Figure 10:
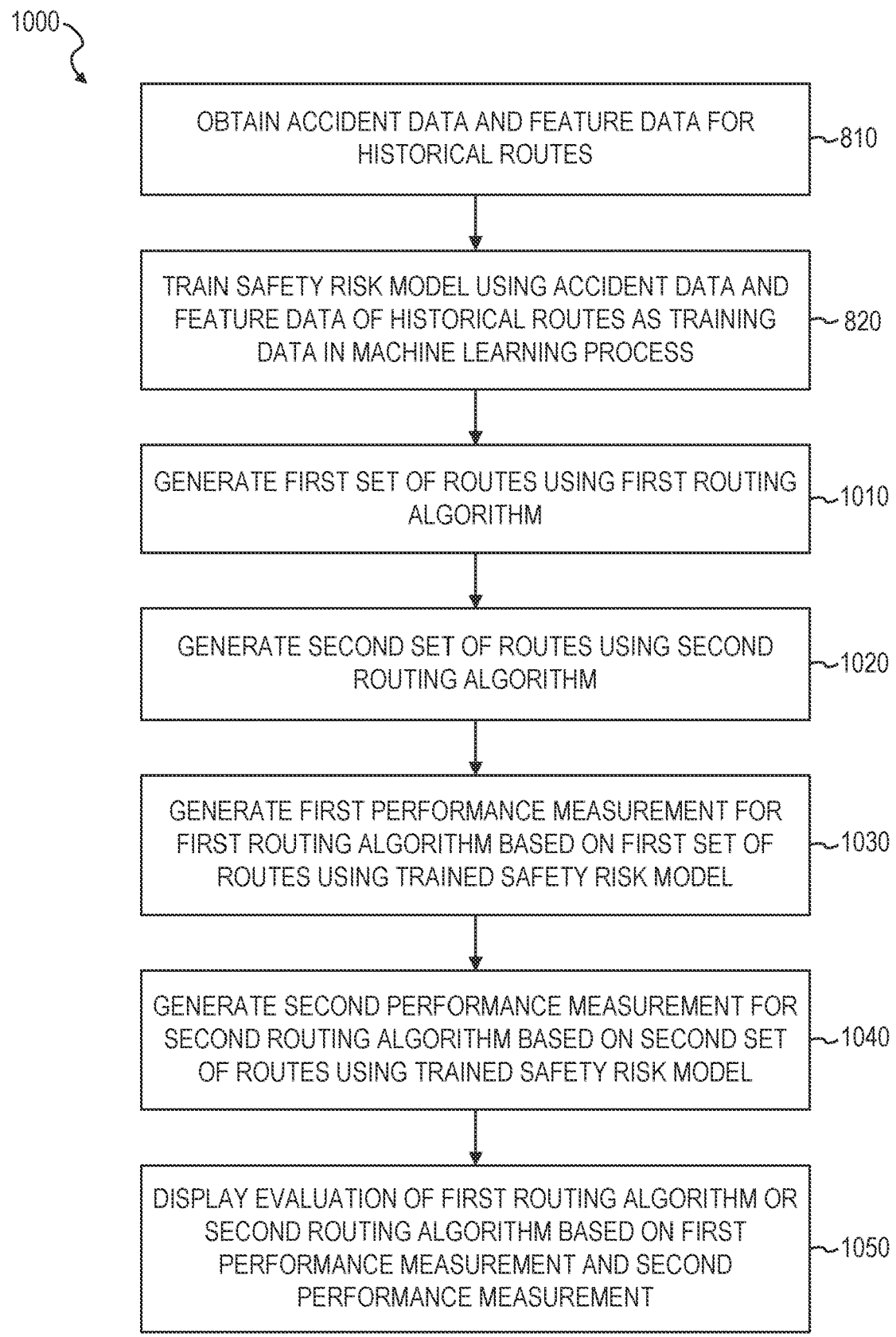
FIG. 10 is a flowchart illustrating a method of using the trained safety risk model to analyze different routing algorithms, in accordance with some example embodiments.

FIG. 10 is a flowchart illustrating a method 1000 of using the trained safety risk model to analyze different routing algorithms, in accordance with some example embodiments. The method 1000 can be performed by processing logic that comprises hardware (e.g., circuitry, dedicated logic, programmable logic, microcode), software (e.g., instructions run on a processing device), or a combination thereof. In one example embodiment, the method 1000 is performed by the networked computer system 100 of FIG. 1 or any combination of one or more of its components or modules (e.g., training module 102, selection module 104, service module 106), as described above. The method 1000 comprises operations 1010, 1020, 1030, 1040, and 1050. In some example embodiments, operations 1010, 1020, 1030, 1040, and 1050 are performed after operation 820 of FIG. 8.

At operation 1010, the networked computer system 100 generates a first set of routes using a first routing algorithm. The first routing algorithm may generate the first set of routes using one or more techniques. For example, the first set of candidate routes may be generated based on a shortest distance from corresponding starting geographic locations to corresponding destination geographic locations, a fastest time to travel from the corresponding starting geographic locations to the corresponding destination geographic locations, a most scenic route, and so forth. Route finding or navigation technologies, such as the Dijkstra algorithm, may be employed by the first routing algorithm.

At operation 1020, the networked computer system 100 generates a second set of routes using a second routing algorithm. Similar to the first routing algorithm, the second routing algorithm may generate the second set of routes using one or more techniques, such as those discussed above with respect to operation 1010. However, the second routing algorithm is different from the first routing algorithm in one or more aspects, such as by having one or more different functions, one or more different parameters, or one or more different weights.

At operation 1030, the networked computer system 100 generates a first performance measurement for the first routing algorithm based on the first set of routes using the trained safety risk model. For example, the networked computer system 100 may generate a corresponding safety risk score for each one of the routes in the first set of routes using the trained safety risk model, such as based on the corresponding accident data and the corresponding feature data for each route. The safety risk scores for the first set of routes may then be used in aggregation to generate the first performance measurement, such as by calculating the average (or some other statistical calculation) of the safety risk scores for the first set of routes, which may then be used as a key performance indicator for the first routing algorithm in evaluating the performance of the first routing algorithm. Other types of performance measurements may be used as well, including, but not limited to, insurance costs based on the safety risk scores of the first set of routes that are generated by the first routing algorithm.

At operation 1040, the networked computer system 100 generates a second performance measurement for the second routing algorithm based on the second set of routes using the trained safety risk model. For example, the networked computer system 100 may generate a corresponding safety risk score for each one of the routes in the second set of routes using the trained safety risk model, such as based on the corresponding accident data and the corresponding feature data for each route. The safety risk scores for the second set of routes may then be used in aggregation to generate the second performance measurement, such as by calculating the average (or some other statistical calculation) of the safety risk scores for the second set of routes, which may then be used as a key performance indicator for the second routing algorithm in evaluating the performance of the second routing algorithm. Other types of performance measurements may be used as well, including, but not limited to, insurance costs based on the safety risk scores of the second set of routes that are generated by the second routing algorithm.

At operation 1050, the networked computer system 100 causes an evaluation of the first routing algorithm or the second routing algorithm to be displayed within a user interface on a computing device of a user. In some example embodiments, the evaluation is based on the first performance measurement and the second performance measurement. For example, the networked computer system 100 may cause the display of the first performance measurement in association with the first routing algorithm (e.g., the calculated average safety risk score for the first set of routes being displayed in association with an identification of the first routing algorithm) and the second performance measurement in association with the second routing algorithm (e.g., the calculated average safety risk score for the second set of routes being displayed in association with an identification of the second routing algorithm).

In some example embodiments, the networked computer system 100 compares the first performance measurement with the second performance measurement in order to compare the performance of the first routing algorithm with the performance of the second routing algorithm, and then displays an evaluation based on the comparison, such as by displaying an indication that the second routing algorithm is an improvement on the first routing algorithm (e.g., based on the second performance measurement being higher than the first performance measurement) or that the second routing algorithm is performatively worse than or otherwise not an improvement on the first routing algorithm (e.g., based on the second performance measurement being less than or equal to the first performance measurement). Other types of evaluations may be generated and displayed by the networked computer system 100 based on the first performance measurement and the second performance measurement.

It is contemplated that any of the other features described within the present disclosure can be incorporated into the method 1000.

It is contemplated that any features of any embodiments disclosed herein can be combined with any other features of any other embodiments disclosed herein. Accordingly, these any such hybrid embodiments are within the scope of the present disclosure.

Example Mobile Device

Figure 12:
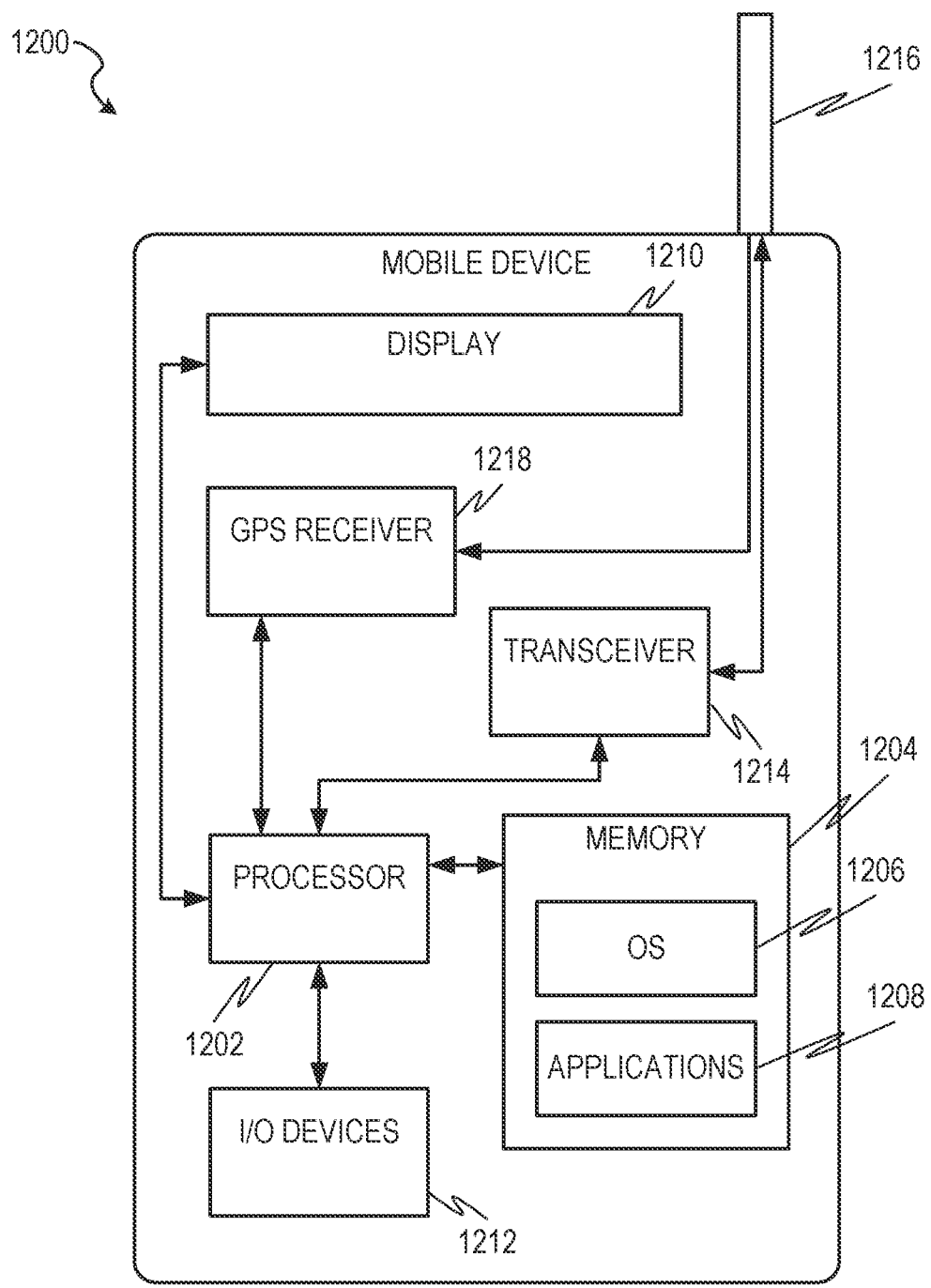
FIG. 12 is a block diagram illustrating a mobile device, in accordance with some example embodiments.

FIG. 12 is a block diagram illustrating a mobile device 1200, according to an example embodiment. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location-enabled application that can provide location-based services (LBSs) to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
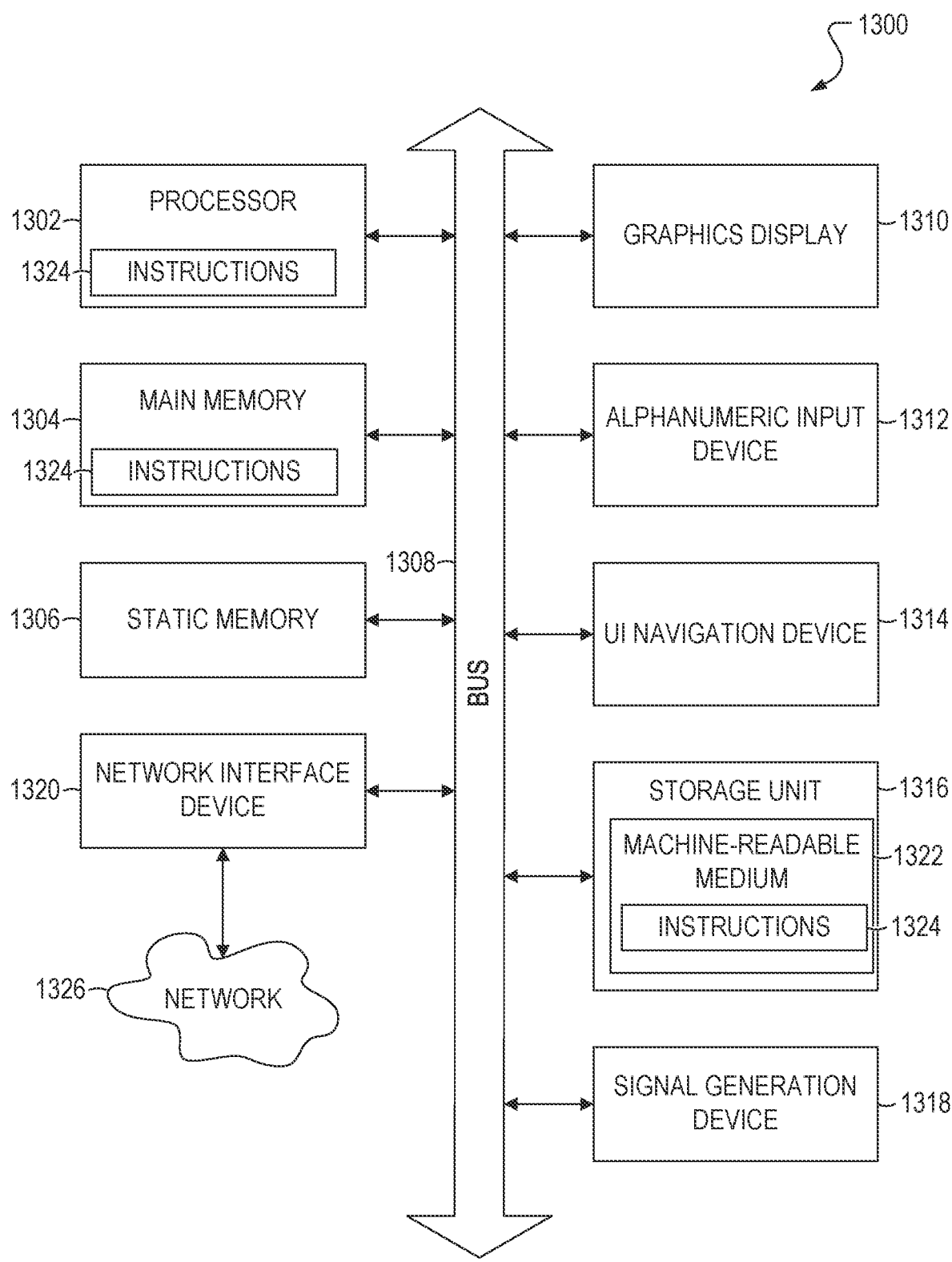
FIG. 13 is a diagrammatic representation of a machine in the form of a computer system within which a set of instructions may be executed for causing the machine to perform any one or more of the methodologies discussed herein, according to an example embodiment.

FIG. 13 is a block diagram of an example computer system 1300 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a storage unit 1316, a signal generation device 1318 (e.g., a speaker) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 1304, 1306, and/or memory of the processor(s) 1302) and/or storage unit 1316 may store one or more sets of instructions and data structures (e.g., software) 1324 embodying or utilized by any one or more of the methodologies or functions described herein. These instructions, when executed by processor(s) 1302 cause various operations to implement the disclosed embodiments.

As used herein, the terms "machine-storage medium," "device-storage medium," "computer-storage medium" (referred to collectively as "machine-storage medium 1322") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1322 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1322 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Numbered Examples of Embodiments

The following numbered examples are embodiments.
1. A computer-implemented method performed by a computer system having at least one hardware processor, the computer-implemented method comprising:
  for each one of a plurality of historical routes that have been communicated electronically as navigation guidance, obtaining corresponding accident data and corresponding feature data, the corresponding accident data indicating whether a vehicular accident occurred in association with the historical route, the feature data being based at least in part on edges and maneuvers that form the historical route;
  training a safety risk model using the accident data and the feature data of the plurality of historical routes as training data in a machine learning process;
  generating a first set of routes using a first routing algorithm;
  generating a second set of routes using a second routing algorithm;
  generating a first performance measurement for the first routing algorithm based on the first set of routes using the trained safety risk model;
  generating a second performance measurement for the second routing algorithm based on the second set of routes using the trained safety risk model; and
  causing an evaluation of the first routing algorithm or the second routing algorithm to be displayed within a user interface on a computing device of a user, the evaluation being based on the first performance measurement and the second performance measurement.

2. The computer-implemented method of example 1, further comprising:
  receiving a request for a route from a starting geographic location to a destination geographic location;
  identifying a route from the starting geographic location to the destination geographic location using the trained safety risk model; and
  transmitting the identified route to another computing device.

3. The computer-implemented method of example 1 or example 2, wherein the transmitting of the identified route to the computing device comprises causing the identified route to be displayed within a user interface on the computing device.

4. The computer-implemented method of any one of examples 1 to 3, wherein the transmitting of the identified route to the computing device comprises transmitting the identified route to an autonomous vehicle for use by the autonomous vehicle in navigating from the starting geographic location to the destination geographic location.

5. The computer-implemented method of examples 4, wherein the identifying of the route comprises:
  generating a plurality of candidate routes from the starting geographic location to the destination geographic location; and
  selecting one of the plurality of candidate routes using the trained safety risk model, the selected one of the plurality of candidate routes being the identified route.

6. The computer-implemented method of any one of examples 1 to 5, wherein the selecting the one of the plurality of candidate routes comprises:
  generating a corresponding safety risk score for each one of the plurality of candidate routes using the trained safety risk model; and
  selecting the one of the plurality of candidate routes based at least in part on the corresponding safety risk score for the selected one of the plurality of candidate routes.

7. The computer-implemented method of any one of examples 1 to 6, wherein each one of the plurality of historical routes was communicated electronically to a corresponding client device of a corresponding provider of a transportation service in association with a corresponding request for the transportation service, the corresponding accident data and the corresponding feature data for each one of the plurality of historical routes being stored in a database in association with the corresponding request for the transportation service.

8. The computer-implemented method of any one of examples 1 to 7, wherein the feature data comprises one or more edge statistics calculated based on the edges of the historical route.

9. The computer-implemented method of any one of examples 1 to 8, wherein the one or more edge statistics comprises one or more of a total number of the edges of the historical route, an edge distance statistic based on distances of the edges of the historical route, an edge duration statistic based on durations associated with the edges of the historical route, an edge speed statistic based on travelling speeds associated with the edges of the historical route, and a road class statistic based on one or more classes of roads associated with the edges of the historical route.

10. The computer-implemented method of any one of examples 1 to 9, wherein the feature data comprises one or more maneuver statistics calculated based on the maneuvers of the historical route.

11. The computer-implemented method of any one of examples 1 to claim 10, wherein the one or more maneuver statistics comprises one or more of a total number of the maneuvers of the historical route, a maneuver distance statistic based on distances of the maneuvers of the historical route, a maneuver duration statistic based on durations associated with the maneuver of the historical route, a maneuver speed statistic based on speeds associated with the maneuvers of the historical route, a heading change statistic based on degrees of heading changes associated with the maneuvers of the historical route, and a compound maneuver statistic based on a total number of compound maneuvers of the historical route.

12. The computer-implemented method of any one of examples 1 to claim 11, wherein the safety risk model comprises one or more models selected from a group of models, the group of models consisting of a gradient boosting decision tree model, a deep learning model, and a generalized linear model.

13. The computer-implemented method of any one of examples 1 to claim 12, wherein each one of the plurality of historical routes comprises a corresponding plurality of road segments, the corresponding accident data for each one of the plurality of historical routes comprising corresponding segment accident data for each one of the corresponding plurality of road segments of the historical route, the segment accident data indicating whether a vehicular accident occurred on the corresponding road segment, the corresponding feature data for each one of the plurality of historical routes comprising segment feature data for each one of the corresponding plurality of road segments of the historical route, the segment feature data being based at least in part on edges or maneuvers corresponding to the road segment.

14. The computer-implemented method of any one of examples 1 to claim 13, further comprising:
receiving a request for a route from a starting geographic location to a destination geographic location;
identifying a route from the starting geographic location to the destination geographic location using the trained safety risk model; and
transmitting the identified route to another computing device.

15. The computer-implemented method of any one of examples 1 to claim 14, wherein the transmitting the identified route to the computing device comprises causing an indication of an elevated risk associated with at least one road segment of the identified route to be displayed in association with the identified route using the trained safety risk model based on corresponding segment feature data of the identified route, the corresponding segment feature data of the identified route being based at least in part on edges or maneuvers corresponding to the at least one road segment of the identified route.

16. The computer-implemented method of any one of examples 1 to claim 15, wherein the identifying of the route comprises:
generating a corresponding safety risk score for each one of a plurality of candidate route segments using the trained safety risk model; and
generating the identified route using the corresponding safety risk scores for the plurality of candidate route segments within a routing algorithm to form the identified route, the identified route being formed from at least a portion of the plurality of candidate route segments.

17. A system comprising:
at least one hardware processor; and
a machine-readable medium embodying a set of instructions that, when executed by the at least one hardware processor, cause the at least one hardware processor to perform the method of any one of examples 1 to 16.

18. A machine-readable medium embodying a set of instructions that, when executed by the at least one hardware processor, cause the at least one hardware processor to perform the method of any one of examples 1 to 16.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a computer system having at least one hardware processor, the computer-implemented method comprising:
obtaining accident data and feature data for each route of a plurality of historical routes that have been communicated electronically as navigation guidance, the accident data indicating whether a vehicular accident occurred in association with the historical route, the feature data being based on maneuvers comprising a maneuver connecting each edge that forms the navigational guidance of the historical route and comprising at least one maneuver statistic from maneuver statistics calculated based on the maneuvers of the historical route, the maneuver statistics comprising one or more of a total number of the maneuvers of the historical route, a maneuver distance statistic based on distances of the maneuvers of the historical route, a maneuver duration statistic based on durations associated with the maneuver of the historical route, a maneuver speed statistic based on speeds associated with the maneuvers of the historical route, a heading change statistic based on degrees of heading changes associated with the maneuvers of the historical route, or a compound maneuver statistic based on a total number of compound maneuvers of the historical route;
training a safety risk model using the accident data and the feature data of the plurality of historical routes as training data in a machine learning process;

receiving a request for a route from a starting geographic location to a destination geographic location;

generating a plurality of candidate routes from the starting geographic location to the destination geographic location;

selecting a candidate route of the plurality of candidate routes based on a safety score for the selected candidate route that was generated using the trained safety risk model; and causing the selected candidate route to be displayed within a user interface on a computing device of a transportation provider for navigation to a given destination.

2. The computer-implemented method of claim 1, wherein the transportation provider is an autonomous vehicle and causing the selected route to be displayed within the user interface comprises transmitting the selected candidate route to the autonomous vehicle for use by the autonomous vehicle in navigating from the starting geographic location to the destination geographic location.

3. The computer-implemented method of claim 1, wherein the selecting the candidate route of the plurality of candidate routes based on a safety score for the selected candidate route that was generated using the trained safety risk model comprises:

generating a safety score for each candidate route of the plurality of candidate routes using the trained safety risk model; and selecting the candidate route of the plurality of candidate routes based at least in part on a corresponding safety score.

4. The computer-implemented method of claim 1, wherein the selecting the candidate route of the plurality of candidate routes based on a safety score for the selected candidate route that was generated using the trained safety risk model comprises:

generating a safety score for each one of the plurality of candidate routes using the trained safety risk model;

ranking the plurality of candidate routes based on a corresponding safety risk score; and selecting the candidate route of the plurality of candidate routes with a corresponding safety score indicating a lowest likelihood of a vehicular accident.

5. The computer-implemented method of claim 1, wherein causing the selected candidate route to be displayed within the user interface on the computing device further comprises displaying an indication of an elevated risk associated with at least one road segment of the selected candidate route.

6. The computer-implemented method of claim 1, wherein the feature data comprises one or more edge statistics calculated based on the edges of the historical route.

7. The computer-implemented method of claim 6, wherein the one or more edge statistics comprises one or more of a total number of the edges of the historical route, an edge distance statistic based on distances of the edges of the historical route, an edge duration statistic based on durations associated with the edges of the historical route, an edge speed statistic based on travelling speeds associated with the edges of the historical route, and a road class statistic based on one or more classes of roads associated with the edges of the historical route.

8. The computer-implemented method of claim 1, wherein the safety risk model comprises one or more models selected from a group of models, the group of models consisting of a gradient boosting decision tree model, a deep learning model, and a generalized linear model.

9. The computer-implemented method of claim 1, wherein each one of the plurality of historical routes comprises a plurality of road segments, the accident data for each one of the plurality of historical routes comprising segment accident data for each one of the plurality of road segments of the historical route, the segment accident data indicating whether a vehicular accident occurred on a corresponding road segment, the feature data for each one of the plurality of historical routes comprising segment feature data for each one of the plurality of road segments of the historical route, the segment feature data being based at least in part on edges or maneuvers corresponding to the road segment.

10. The computer-implemented method of claim 1, wherein selecting the candidate route of the plurality of candidate routes based on a safety score for the selected candidate route that was generated using the trained safety risk model further comprises filtering out candidate routes for selection that have a corresponding safety score below a predetermined threshold.

11. A system comprising:

at least one hardware processor; and a machine storage medium embodying a set of instructions that, when executed by the at least one hardware processor, cause the at least one hardware processor to perform operations comprising:

obtaining accident data and feature data for each route of a plurality of historical routes that have been communicated electronically as navigation guidance, the accident data indicating whether a vehicular accident occurred in association with the historical route, the feature data being based on maneuvers comprising a maneuver connecting each edge that forms the navigational guidance of the historical route and comprising at least one maneuver statistic from maneuver statistics calculated based on the maneuvers of the historical route, the maneuver statistics comprising one or more of a total number of the maneuvers of the historical route, a maneuver distance statistic based on distances of the maneuvers of the historical route, a maneuver duration statistic based on durations associated with the maneuver of the historical route, a maneuver speed statistic based on speeds associated with the maneuvers of the historical route, a heading change statistic based on degrees of heading changes associated with the maneuvers of the historical route, or a compound maneuver statistic based on a total number of compound maneuvers of the historical route;

training a safety risk model using the accident data and the feature data of the plurality of historical routes as training data in a machine learning process;

receiving a request for a route from a starting geographic location to a destination geographic location;

generating a plurality of candidate routes from the starting geographic location to the destination geographic location;

selecting a candidate route of the plurality of candidate routes based on a safety score for the selected candidate route that was generated using the trained safety risk model; and causing the selected candidate route to be displayed within a user interface on a computing device of a transportation provider for navigation to a given destination.

12. The system of claim 11, wherein the transportation provider is an autonomous vehicle and causing the selected route to be displayed within the user interface comprises transmitting the selected candidate route to the autonomous vehicle for use by the autonomous vehicle in navigating from the starting geographic location to the destination geographic location.

13. The system of claim 11, wherein the selecting the candidate route of the plurality of candidate routes based on a safety score for the selected candidate route that was generated using the trained safety risk model comprises:
   generating a safety score for each candidate route of the plurality of candidate routes using the trained safety risk model; and
   selecting the candidate route of the plurality of candidate routes based at least in part on a corresponding safety score.

14. The system of claim 11, wherein the selecting the candidate route of the plurality of candidate routes based on a safety score for the selected candidate route that was generated using the trained safety risk model comprises:
   generating a safety score for each one of the plurality of candidate routes using the trained safety risk model;
   ranking the plurality of candidate routes based on a corresponding safety risk score; and
   selecting the candidate route of the plurality of candidate routes with a corresponding safety score indicating a lowest likelihood of a vehicular accident.

15. The system of claim 11, wherein causing the selected candidate route to be displayed within the user interface on the computing device further comprises displaying an indication of an elevated risk associated with at least one road segment of the selected candidate route.

16. The system of claim 11, wherein the feature data comprises one or more edge statistics calculated based on the edges of the historical route.

17. The system of claim 16, wherein the one or more edge statistics comprises one or more of a total number of the edges of the historical route, an edge distance statistic based on distances of the edges of the historical route, an edge duration statistic based on durations associated with the edges of the historical route, an edge speed statistic based on travelling speeds associated with the edges of the historical route, and a road class statistic based on one or more classes of roads associated with the edges of the historical route.

18. The system of claim 11, wherein the safety risk model comprises one or more models selected from a group of models, the group of models consisting of a gradient boosting decision tree model, a deep learning model, and a generalized linear model.

19. The system of claim 11, wherein selecting the candidate route of the plurality of candidate routes based on a safety score for the selected candidate route that was generated using the trained safety risk model further comprises filtering out candidate routes for selection that have a corresponding safety score below a predetermined threshold.

20. A machine storage medium embodying a set of instructions that, when executed by at least one hardware processor, cause the processor to perform operations comprising:
   obtaining accident data and feature data for each route of a plurality of historical routes that have been communicated electronically as navigation guidance, the accident data indicating whether a vehicular accident occurred in association with the historical route, the feature data being based on maneuvers comprising a maneuver connecting each edge that forms the navigational guidance of the historical route and comprising at least one maneuver statistic from maneuver statistics calculated based on the maneuvers of the historical route, the maneuver statistics comprising one or more of a total number of the maneuvers of the historical route, a maneuver distance statistic based on distances of the maneuvers of the historical route, a maneuver duration statistic based on durations associated with the maneuver of the historical route, a maneuver speed statistic based on speeds associated with the maneuvers of the historical route, a heading change statistic based on degrees of heading changes associated with the maneuvers of the historical route, or a compound maneuver statistic based on a total number of compound maneuvers of the historical route;
   training a safety risk model using the accident data and the feature data of the plurality of historical routes as training data in a machine learning process;
   receiving a request for a route from a starting geographic location to a destination geographic location;
   generating a plurality of candidate routes from the starting geographic location to the destination geographic location;
   selecting a candidate route of the plurality of candidate routes based on a safety score for the selected candidate route that was generated using the trained safety risk model; and
   causing the selected candidate route to be displayed within a user interface on a computing device of a transportation provider for navigation to a given destination.

* * * * *